(12) United States Patent
Goulet et al.

(10) Patent No.: US 11,755,380 B1
(45) Date of Patent: Sep. 12, 2023

(54) METHODS AND APPARATUS FOR A MULTI-TENANT COMPUTER SYSTEM FOR PRODUCING SERVICE RESULTS BY MATCHING AND RESOLVING CONFLICTS OF SERVICE REQUESTS FROM CLIENT COMPUTE DEVICES

(71) Applicant: Flueid Software Corporation, Austin, TX (US)

(72) Inventors: Michael J. Goulet, Henniker, NH (US); Matthew M. Regan, Austin, TX (US); Ryan A. Jaeger, Santa Paula, CA (US); Peter Bowman, Santa Barbara, CA (US); Peter Richter, Austin, TX (US); Scott Laplante, Fairport, NY (US)

(73) Assignee: Flueid Software Corporation, Austin, TX (US)

( * ) Notice: Subject to any disclaimer, the term of this patent is extended or adjusted under 35 U.S.C. 154(b) by 0 days.

(21) Appl. No.: 18/110,493

(22) Filed: Feb. 16, 2023

(51) Int. Cl.
*G06F 9/50* (2006.01)

(52) U.S. Cl.
CPC .................. *G06F 9/5072* (2013.01)

(58) Field of Classification Search
CPC ............ G06F 16/2228; G06F 16/2386; G06F 16/1734; G06F 16/28; G06F 16/245; G06F 16/273; H04L 67/125; H04L 43/067; H04L 51/046; G06Q 10/06398
See application file for complete search history.

(56) References Cited

U.S. PATENT DOCUMENTS

| 7,212,995 | B2 | 5/2007 | Schulkins |
| 7,653,592 | B1 | 1/2010 | Flaxman et al. |
| 10,176,540 | B2 | 1/2019 | Blackman et al. |
| 10,846,807 | B2 | 11/2020 | Blackman et al. |
| 11,095,756 | B1 | 8/2021 | Bowman et al. |

(Continued)

FOREIGN PATENT DOCUMENTS

| CN | 109565505 A | 4/2019 |
| EP | 3511822 A1 | 7/2019 |

OTHER PUBLICATIONS

Vizuri, Improving Speed and Accuracy of Underwriting for a Fortune 100 Insurance Company, Retrieved from the Internet: https://www.vizuri.com/hubfs/Fortune%20100%20Insurance%20Case%20Study.pdf?hsLang=en-us. Publication date unavailable; no archive available on archive.org, 5 pages.

*Primary Examiner* — Mahran Y Abu Roumi
(74) *Attorney, Agent, or Firm* — COOLEY LLP

(57) ABSTRACT

An apparatus includes a multi-tenant computer system including a processor and a memory operatively coupled to the processor. The apparatus receives a first service request from a first compute device and a second service request from a second compute device. Data values of the first service request are not accessible by the second compute device and data values of the second request are not accessible by the first compute device. The apparatus merges the data values of the first service request and the data values of the second service request and filters the results based on a set of rules not accessible to the second compute device to produce a first filtered result responsive to the second service request. The apparatus also filters the results based on a set of rules not accessible to the first compute device to produce a second filtered result responsive to the first service request.

18 Claims, 12 Drawing Sheets

(56) References Cited

U.S. PATENT DOCUMENTS

| | | |
|---|---|---|
| 11,310,344 B1 | 4/2022 | Bowman et al. |
| 2003/0036994 A1 | 2/2003 | Witzig et al. |
| 2004/0059653 A1 | 3/2004 | Verkuylen et al. |
| 2005/0209867 A1 | 9/2005 | Diesch et al. |
| 2015/0235310 A1 | 8/2015 | Rozman et al. |
| 2017/0186084 A1 | 6/2017 | Koch |
| 2017/0270602 A1 | 9/2017 | Snell et al. |
| 2018/0082072 A1 | 3/2018 | Hosie et al. |
| 2019/0318122 A1 | 10/2019 | Hockey et al. |
| 2019/0361852 A1* | 11/2019 | Rogynskyy ......... G06F 16/2228 |
| 2020/0125700 A1 | 4/2020 | Chang et al. |
| 2020/0310599 A1 | 10/2020 | Mukherjee et al. |
| 2020/0412735 A1* | 12/2020 | Suhail ................... H04L 63/105 |
| 2021/0035245 A1 | 2/2021 | Blackman et al. |
| 2021/0065141 A1* | 3/2021 | Batra ..................... G06F 9/547 |
| 2021/0081947 A1 | 3/2021 | Hockey et al. |

\* cited by examiner

800B

| UPDATED FIELD SIDE A \ UPDATED FIELD SIDE B | RECESSIVE | DOMINANT | DOMINANT EXCLUSIVE |
|---|---|---|---|
| RECESSIVE | B | B | B |
| DOMINANT | B | B | B |
| DOMINANT EXCLUSIVE | REMOVE B | REMOVE B | A |

FIG. 8B

METHODS AND APPARATUS FOR A MULTI-TENANT COMPUTER SYSTEM FOR PRODUCING SERVICE RESULTS BY MATCHING AND RESOLVING CONFLICTS OF SERVICE REQUESTS FROM CLIENT COMPUTE DEVICES

FIELD

The present disclosure generally relates to the field of computer network conflict resolution. In particular, the present disclosure is related to methods and apparatus for a multi-tenant computer system for producing service results by matching and resolving conflicts of service requests from client compute devices.

BACKGROUND

Digital platforms enable multiple users to conduct various transactions. Some existing digital platforms can enable users to communicate or conduct various transactions with users operating different digital platforms. Digital platforms that support transactions with different digital platforms, however, are inefficient, which can lead to inaccuracy, errors, and delays.

Additionally, ensuring that transactions are accurate can often involve significant human intervention to resolve conflicts and manage data prioritization between separate digital platforms. In an environment with confidential data being transacted, a need exists to enable users to exchange information and control the information being exchanged efficiently and securely.

SUMMARY

In one or more embodiments, a non-transitory processor-readable medium storing code representing instructions to be executed by a processor is presented. The code causes the processor to receive, at a multi-tenant computer system and from a first compute device, a first service request having data values specified by the first compute device and associated with fields. The code further causes the processor to receive, at the multi-tenant computer system and from a second compute device, a second service request having data values specified by the second compute device and associated with the fields. The data values of the first service request are not accessible by the second compute device and data values of the second request are not accessible by the first compute device. The code further causes the processor to merge, at the multi-tenant computer system, the data values of the first service request and the data values of the second service request to produce merged data values. The code further causes the processor to filter, at the multi-tenant computer system, the merged data values based on a set of rules specified by the first compute device to produce a first filtered result. The set of rules specified by the first compute device is not accessible to the second compute device. The code further causes the processor to send, from the multi-tenant computer system and to the first compute device and the second compute device, a service result that is responsive to the second service request and that includes the first filtered result and not remaining merged data values from the merged data values. The code further causes the processor to filter, at the multi-tenant computer system, the merged data values based on a set of rules specified by the second compute device to produce a second filtered result. The set of rules specified by the second compute device is not accessible to the first compute device. The code further causes the processor to send, from the multi-tenant computer system and to the first compute device and the second compute device, a service result that is responsive to the first service request and that includes the second filtered result and not remaining merged data values from the merged data values.

In one or more embodiments, an apparatus, includes a multi-tenant computer system including a processor and a memory operatively coupled to the processor. The memory is configured to store (1) a first service request having data values specified by a first compute device and associated with fields, (2) a set of rules specified by the first compute device, (3) a second service request having data values specified by the second compute device and associated with fields, and (4) a set of rules specified by the second compute device. The data values of the first service request and the set of rules specified by the first compute device are not accessible by the second compute device. The data values of the second request the set of rules specified by the second compute device are not accessible by the first compute device. The processor is configured to merge the data values of the first service request and the data values of the second service request to produce merged data values. The processor is further configured to filter the merged data values based on the set of rules specified by the first compute device to produce a first filtered result. The processor is further configured to send to the first compute device and the second compute device a service result that is responsive to the second service request and that includes the first filtered result and not remaining merged data values from the merged data values. The processor is further configured to filter the merged data values based on the set of rules specified by the second compute device to produce a second filtered result. The processor is further configured to send to the first compute device and the second compute device a service result that is responsive to the first service request and that includes the second filtered result and not remaining merged data values.

In one or more embodiments, a non-transitory processor-readable medium storing code representing instructions to be executed by a processor is presented. The code causes the processor to receive, at a multi-tenant computer system and from a first compute device, a first service request having data values specified by the first compute device and associated with a plurality of fields. The code further causes the processor to receive, at the multi-tenant computer system and from a second compute device, a second service request having data values specified by the second compute device and associated with the plurality of fields. The data values of the first service request are not accessible by the second compute device and the data values of the second request are not accessible by the first compute device. The code further causes the processor to merge, at the multi-tenant computer system, the data values of the first service request and the data values of the second service request to produce merged data values. The code further cause the processor to resolve conflicts, at the multi-tenant computer system, within the merged data values to produce merged data with the resolved conflicts. The code further causes the processor to send a first portion of the merged data with resolved conflicts to the second compute device and to the first compute device to cause the first compute device to update the data values specified by the first compute device based on the first portion of the merged data with resolved conflicts. The code further causes the processor to send a second portion of the merged data with resolved conflicts to the first compute device and to the second compute device to cause the second compute device to update the data values specified by the second compute device based on the second portion of the merged data with resolved conflicts. The second portion of the merged data with resolved conflicts is different than the first portion of the merged data with resolved conflicts.

BRIEF DESCRIPTION OF THE DRAWINGS

FIG. 8A-B are illustrations depicting prioritization of service requests for the multi-tenant computer system, according to one or more embodiments.

DETAILED DESCRIPTION

Figure 1:
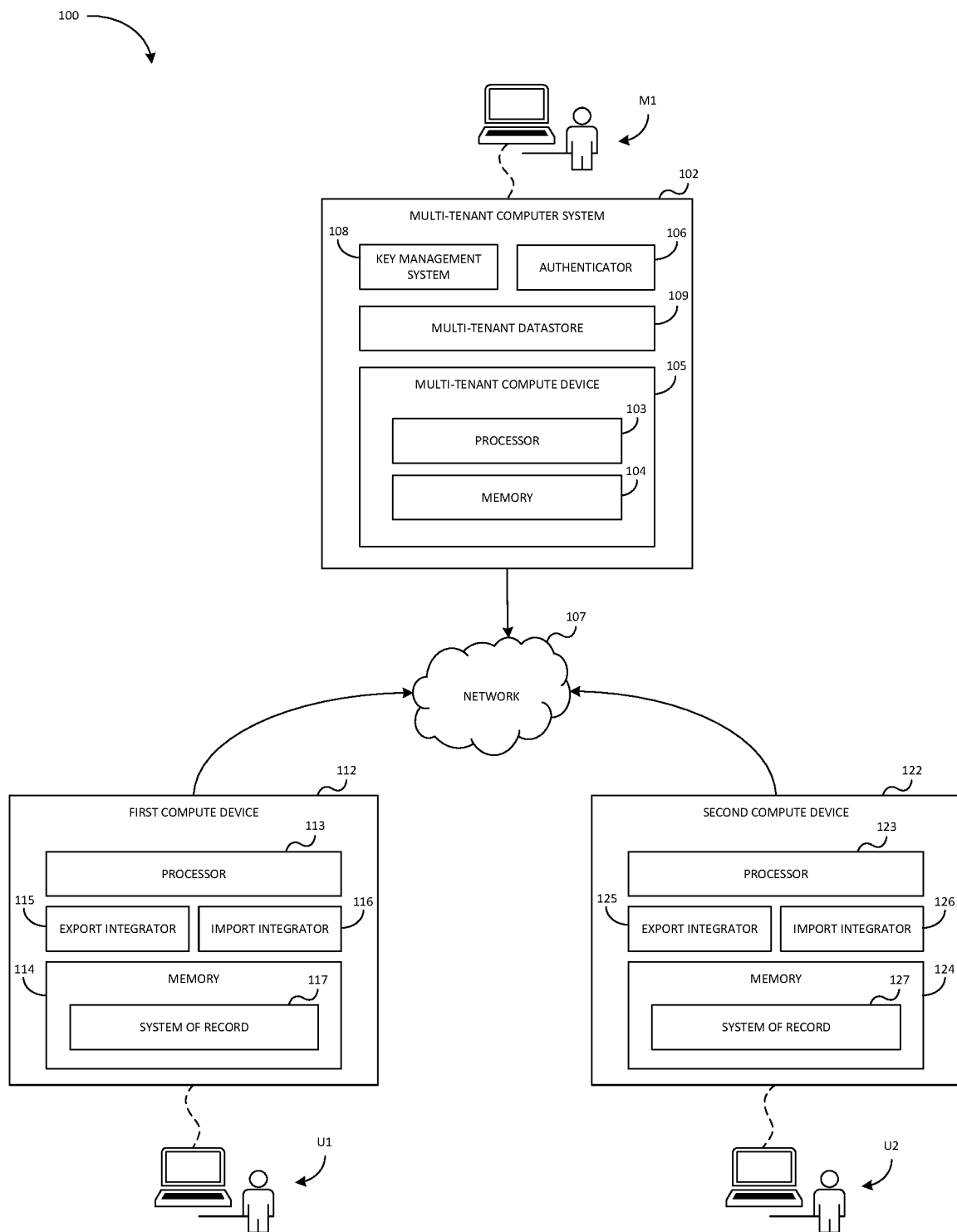
FIG. 1 is a block diagram of a system for a multi-tenant computer system for producing service results by matching and resolving conflicts of service requests from client compute devices, according to one or more embodiments.

In some embodiments, an apparatus includes a multi-tenant computer system that can enable multiple compute devices operated by multiple users (also referred herein as "collaborators") such as, for example, partners, clients, and/or the like, to exchange information and control the creation and processing of service requests (also referred herein as "transactions") efficiently and/or securely. In some implementations, the multi-tenant computer system can enable a user to control an exchange of information associated with the user to other users. In some implementations, the apparatus includes datastores that can store personally identifiable information (PII) and/or non-public personal information (NPI) for each user in a multi-tenant computer system. In some instances, each user can authorize the multi-tenant system to operate the datastore of that user. In some implementations, the apparatus can enable users to issue credentials such that the multi-tenant computer system can produce and consume data from the users. In some instances, users that control their own data in their own datastores can revoke access from the multi-tenant computer system at any time (i.e., "break-glass").

In some embodiments, the apparatus including the multi-tenant computer system can encrypt and/or decrypt NPI/PII fields within service requests from users using cryptographic/encryption keys controlled by the users. The users can also revoke access from the multi-tenant computer system to those cryptographic/encryption keys at any time. In some implementations, the multi-tenant computer system, based on authorization from the users, can transfer user data to and from other users using a service configuration owned and/or approved by the users. The service configuration can be a pre-configured mechanism and/or any combination of hardware, software, firmware, and/or the like, that can control the formation and/or processing of service requests (e.g., transactions) between users. The service configuration can also provide flexible secure control over an initiation and processing of service requests between users. In some cases, the service configuration can enable users to select other users to exchange information with on different types of transactions and/or based on pre-defined rules such as, for example, locality rules (e.g., "we work with Company A on refinance transactions in California only"), temporal rules (e.g., "we work with Company B during summer months"), transaction distribution rules (e.g., "we give Company A 60% of our business and Company B the remaining 40%"), transaction type (e.g., "we work with Company A on refinance transactions, but not equity transactions"), and/or the like.

In some implementations, users can mutually agree to request and/or provide services in a complementary fashion. For instance, Company A can provide lending services on refinance transactions where Company B can provide title services for refinance transactions. The apparatus can facilitate transfer of data between Company A and Company B if both parties agree to exchange information and provide its own service configuration at their own datastores. In some implementations, the apparatus can maintain a veto on transactions allowed between users. Similarly, users can also maintain vetoes on their own transactions. In some implementations, both the users and the multi-tenant computer system of the apparatus all agree before transactions are enabled and data is exchanged.

In some embodiments, the apparatus can implement a prioritization scheme owned and/or approved by a user that can authorize the multi-tenant computer system to transfer data from the user between other users. In some implementations, the prioritization scheme can be or include a pre-configured mechanism that allows a user to prioritize data to transfer to other users on varying types of transactions. In some cases, different priorities enable users to accept data from other users, remove data as removed by other users, and/or identify conflicts with other users. In other words, the prioritization scheme can minimize conflicts and/or facilitate flow of transactions and/or requests.

In some embodiments, the apparatus can transfer service requests of a user between other users using a filter owned and/or approved by the user. The filter can control information and/or data that is sent from one user to another. In some implementations, the apparatus can produce events indicating a service request to be transferred from one user to another such that the filter can be applied to the service request owned by the user sending the service request. For example, a service request can contain data to be transferred from a first user to a second user where the data can include, for example, a first name, a last name, a social security number, and/or the like. In some cases, the first user can apply a filter such that a subset of the data in the service request is sent to the second user and remaining data is not. The filter, for example, can be retrieved from a datastore associated with the first user and can authorize the multi-tenant computer system to access the data of the service request. The filter, for example, can be configured to transfer the first name and the last name found in the data while excluding the social security number. In other words, the filter can decouple complex transaction rules and/or processing logic from tasks including, for example, identifying information to be transferred under varying conditions. In some implementations, the filter can incorporate rules (e.g., filter templates) provided by the user to implement policies for exchanging data.

In some embodiments, the apparatus can enable key management systems owned by users to control data and rules within the multi-tenant computer system. A key management system can be exclusively controlled by a user and can revoke access from the multi-tenant computer system in a "break-glass" fashion at any time, i.e., checking out of the multi-tenant computer system to bypass normal access controls procedures. In some implementations, each user can use different encryption keys (also referred to herein as "cryptographic keys") and different key management systems cannot decrypt data of other users without providing access to the multi-tenant computer system, such that the multi-tenant computer system can facilitate transfer of data under rules and/or terms for each user. In some implementations, encryption keys are uniquely generated for each user such that an encryption key can be decrypted using a key management system associated with the each user. The multi-tenant computer system can decrypt, via the key management system of the user, the encryption key of the user such that the encryption key can be used to encrypt and/or decrypt the data for other exchanges with other users.

In some embodiments, the multi-tenant computer system can realize existing and/or potential transactions linked between (or associated among) users based on service requests. The service configuration of the multi-tenant computer system can identify various methods of how transactions between users are realized. For example, methods can include an automatic transaction, fuzzy transaction, manual transaction, and/or the like. The automatic transaction can automatically identify existing transactions with specific users. If there is no transaction with the specific user, the multi-tenant computer system can create a new transaction. In some cases, the automatic transaction can be used, for example, for ordering services. The fuzzy transaction can include using fuzzy logic to identify data from another user on fields such as, for example, borrower information, subject property information, order numbers, loan numbers, and/or the like. The manual transaction can include selecting, by operators of users, to manually link service requests together into unified transactions.

FIG. 1 is a block diagram of a system 100 for a multi-tenant computer system 102 for producing service results by matching and resolving conflicts of service requests from client compute devices, according to one or more embodiments. The system 100 can include the multi-tenant computer system 102 operated by a multi-tenant operator M1, a network 107, a first compute device 112 operated by a first operator U1, and/or a second compute device 122 operated by a second operator U2. Each of the compute devices from the first compute device 112 and the second compute device 122 can be referred to as a "client compute device." The multi-tenant computer system 102 can be or include a cloud environment. The multi-tenant computer system 102 can include a multi-tenant compute device 105. The multi-tenant compute device 105 can include a processor 103 and a memory 104 operatively coupled to the processor 103 that communicates with each other, and with other components via a bus (not shown in FIG. 1). The bus can include any of several types of bus structures including, but not limited to, a memory bus, a memory controller, a peripheral bus, a local bus, and any combinations thereof, using any of a variety of bus architectures. The multi-tenant compute device 105 can be or include, for example, a computer workstation, a terminal computer, a server computer, a handheld device (e.g., a tablet computer, a smartphone, etc.), and/or any machine capable of executing a sequence of instructions that specify an action to be taken by that machine, and any combinations thereof. The multi-tenant compute device 105 can also include multiple compute devices (not shown in FIG. 1) that can be used to implement a specially configured set of instructions for causing one or more compute devices within the multi-tenant compute device 105 to perform any one or more of the aspects and/or methodologies described herein.

The multi-tenant compute device 105 can include a network interface (not shown in FIG. 1). The network interface device can be used for connecting the multi-tenant compute device 105 to one or more of a variety of networks (e.g., the network 107) and one or more remote computes connected thereto. In other words, although not shown in FIG. 1, the various compute devices can communicate with other devices via the network 107. In some implementations, the network 107 can include, for example, a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 107 can be a wireless network such as, for example, a Wi-Fi or wireless local area network ("WLAN"), a wireless wide area network ("WWAN"), and/or a cellular network. In other instances, the network can be a wired network such as, for example, an Ethernet network, a digital subscription line ("DSL") network, a broadband network, and/or a fiber-optic network. In some instances, the multi-tenant compute device 105 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network can be encrypted. In some instances, the network 107 can include multiple networks or subnetworks operatively coupled to one another by, for example, network bridges, routers, switches, gateways and/or the like The processor 103 can be or include, for example, a hardware-based integrated circuit (IC), or any other suitable processing device configured to run and/or execute a set of instructions or code. For example, the processor 103 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 103 can be configured to run any of the methods and/or portions of methods discussed herein.

The memory 104 can be or include, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 103 to perform one or more processes, functions, and/or the like (e.g., code to fetch authentication data and/or authorization data from the first compute device 112 and/or the second compute device 122). In some implementations, the memory 104 can include extendable storage units that can be added and used incrementally. In some implementations, the memory 104 can be a portable memory (e.g., a flash drive, a portable hard disk, and/or the like) that can be operatively coupled to the processor 103. The memory 104 can include various components (e.g., machine-readable media) including, but not limited to, a random-access memory component, a read only component, and any combinations thereof. In one example, a basic input/output system (BIOS), including basic routines that help to transfer information between components within the multi-tenant compute device 105 such as during start-up, can be stored in memory 104. The memory 104 can further include any number of program modules including, for example, an operating system, one or more application programs, other program modules, program data, and any combinations thereof. It should be understood that, in some embodiments, one or more compute devices and/or one or more multi-tenant computer system can be used in the multi-tenant computer system 102.

The multi-tenant computer system 102 can include a key management system 108, an authenticator 106, and/or a multi-tenant datastore 109. A key management system can be, for example, a software/hardware component used to securely generate, store, and/or manage cryptographic/encryption keys. The cryptographic/encryption keys can be used, for example, to encrypt and decrypt data (e.g. service requests) to provide confidentiality, integrity, and/or authenticity for communications and storage of data. In some implementations, the key management system can be, for example, responsible for generating and/or managing cryptographic/encryption keys. The key management system can be located at the multi-tenant compute device 105 and/or in a cloud environment (e.g., the multi-tenant computer system 102) such that the key management system (e.g., the key management system 108) can be accessed by users (e.g., first operator U1 and/or the second operator U2) over the network 107. In some implementations, the key management system 108 can use a secure key management protocol, such as, for example, a Key Management Interoperability Protocol (KMIP), to securely generate and/or distribute cryptographic/encryption keys to the users (e.g., first operator U1 and/or the second operator U2) and other key management systems (not shown in FIG. 1). In some implementations, the key management system 108 can include security measures, such as, for example, hardware security modules (HSMs) to protect cryptographic/encryption keys from unauthorized access. In some implementations, the key management system 108 can include software/hardware used by users to securely access and use cryptographic/encryption keys for encrypting and/or decrypting data (e.g., service requests), managing cryptographic/encryption keys, managing cryptographic/encryption key permissions, and/or the like.

In some implementations, the key management system 108 can be used to encrypt service requests from the first compute device 112 and/or the second compute device 122. In some implementations, the multi-tenant computer system 102 can configure encryption of encryption key for the first compute device 112 and/or the second compute device 122 via the key management system 108 of the multi-tenant computer system 102. In some cases, the processor 103 of the multi-tenant compute device 105 can transfer ownership of the encryption keys, once generated, to the first compute device 112 and/or the second compute device 122 such that the multi-tenant computer system 102 and/or the multi-tenant compute device 105 loses control and/or access of the transferred encryption keys. Once ownership is transferred, the multi-tenant computer system 102 and/or the multi-tenant compute device 105 can no longer configure further encryption processes of the encryption keys. In some cases, the multi-tenant computer system 102 and/or the multi-tenant compute device 105 can gain and/or lose access and/or control to an encryption key from a compute device at any time, based on the operator of the compute device. In some implementations the first compute device 112 and/or the second compute device 122 can allow the multi-tenant computers system 102 to share data within the key management system 108 of the multi-tenant computer system 102 and/or the multi-tenant datastore 109. Data specific to an operator (e.g., first operator U1 or second operator U2) can be isolated within the key management system 108 and/or the multi-tenant datastore 109 of the multi-tenant computer system 102 such that the data can be easily changed to isolated or collocated depending on a preference by that operator. In some implementations, the multi-tenant computer system 102 can require the first operator U1 and/or the second operator U2 to maintain a minimum rate of transaction with each other and/or other operators to enable the first operator U1 and/or the second operator U2 to own a separate cloud account. The first operator U1 can be or include, for example, a client, a partner, a user, and/or the like. The second operator U2 can be or include, for example, a client, a partner, a user and/or the like. In some implementations, the first operator U1 and/or the second operator U2 can be, for example, a human operator, an automated operator, and/or the like. In some cases, the first operator U1 can be a sender of a transaction and the second operator U2 can be a recipient of that transaction.

A service request can be, for example, an initiated and/or pre-existed request by one operator (e.g., the first operator U1) to another operator (e.g., the second operator U2) to exchange information. The service request can include, for example, data values associated with and/or specified by a compute device from which the data values originate. The data values can also be associated with fields. In some implementations, the fields can be or include collections of data and/or information that one user exchanges with another user. The fields can be, for example, first name, last name, social security number, and/or the like. Data values can be information for the fields such as, for example, "Joan" for a first name field, "Smith" for a last name field, "000-00-000" for a social security number field, and/or the like. In some implementations, the first service request and the second service request can share the same fields while having different data values for each field. The collections of data can be further described in detail in FIG. 7. In some implementations, the multi-tenant datastore 109 can store data such as, for example, service requests, service results, transactional data, public information, information identifying each operator, and/or the like. The multi-tenant datastore 109 can also store, for example, data involved in exchanges associated with the first compute device 112 and the second compute device 122.

In some implementations, the authenticator 106 can be, for example, a software component responsible for verifying an identity of a user (e.g., the first operator U1 and/or the second operator U2). In some cases, verifying identify can include user information such as, for example, username and password, biometric factors, hardware-based tokens (e.g., authentication tokens), and/or the like. In some implementations, the authenticator 106 can be integrated with other components, such as, for example, the key management system 108, to provide additional security and/or functionality. In some implementations, the authenticator 106 can use one or more authentication mechanisms to verify the identity of the user by, for example, checking credentials of the user against a directory server, verifying the biometric data of the user, and/or validating the hardware-based token of the user.

In some implementations, the authenticator 106 can generate and/or provide an authentication token(s) to the first compute device 112 and the second compute device 122. The authentication token(s) provided by the authenticator 106 can be used in service requests generated by the first compute device 112 and/or the second compute device 122 and sent from the multi-tenant computer system 102. The authentication token(s) can combine user-specific parameters (e.g., parameters specified by either the first compute device 112 and/or the second compute device 122) and can be used to uniquely identify and authenticate a single-tenant account (e.g., an account owned by a compute device and associated with the multi-tenant computer system 102). In some implementations, the multi-tenant computer system 102 and/or the multi-tenant compute device 105 can be accessed through the use of an application programming interface (API). The API can, for example, be used to present a graphical user interface (GUI), via a display (not shown in FIG. 1) of the first compute device 112 and the second compute device 122 to send the and/or receive service requests.

In some implementations, the authenticator 106 can generate authentication tokens for the first compute device 112 and the second compute device 122 to establish an authentication of the first compute device 112 and the second compute device 122. In some implementations, the first compute device 112 and the second compute device 122 can fetch the authentication token of the other compute device to establish communication between the first compute device 112 and the second compute device 122.

In some implementations, each compute device from the first compute device 112 and the second compute device 122 can have a single-tenant account and access a software instantiation stored and executed on the multi-tenant computer system 102. Each software instantiation can be stored in at least one multitenant computer system (e.g., the multi-tenant computer system 102) and can be uniquely associated with each single-tenant account. Each software instantiation from can include functions and procedures accessible by the API of the multi-tenant computer system 102 and/or the multi-tenant compute device 105. The functions and procedures accessible by the API can be executed by, for example, the processor 103 of the multi-tenant compute device 105. This is so, at least in part, such that having a separate software instantiation for each compute device can enable each compute device to maintain control and privacy over data and processing of data. Each compute device can contact the multi-tenant compute devices within the multi-tenant computer system 102 for generating and sending authentication tokens, sending configuration parameters (e.g., set of rules) to customize the software instantiation for the single-tenant account of each compute device, and/or the like.

The multi-tenant datastore 109 can also store service requests describing, for example, billing data, reporting data, and/or performance data. The billing data can include, for example, account information and information about tasks to be billed, etc., which can be used to generate a bill for the operators (e.g., first operator U1 and second operator U2) of the compute devices (e.g., first compute device 112 and second compute device 122). The performance data can include, for example, a set of metrics associated with a software instantiation's storage load, processing load, and/or an overall health (e.g. transactions per second, requests per second, timing for results returned, and/or the like). The reporting data can include, for example, a set of characteristics (e.g., a progress log, a processing speed, and/or the like) about how a file (e.g., a service request) from a compute device (e.g., first compute device 112 or second compute device 122) is processed. The billing data, reporting data and/or performance data can be generated, for example, at the multi-tenant computer system 102 and relate to an operator from which the billing data, reporting data and/or performance data originates.

The transactional data of a compute device is not directly accessible to other compute devices. As such the multi-tenant compute device 105 can keep transactional data of a compute device private from other compute devices. For instance, the first compute device 112 can transmit a first service request to the multi-tenant computer system 102 where the first service request includes data values and fields specified to the first compute device 112. The first service request can be, for example, an initiated or pre-existing request by the first operator U1 to exchange information with the second operator U2. In some implementations, the second compute device 122 can transmit a second service request to the multi-tenant computer system 102 where the second service request includes data values and fields specified to the second compute device 122. The second service request can be, for example, an initiated or pre-existing request by the second operator U2 to exchange information with the first operator U1. The data values of the first service request of the first compute device 112 is not accessible to the second compute device 122 and the data values of the second request of the second compute device 122 is not accessible to the first compute device 112. In other words, each compute device and/or operator controls its own data.

The multi-tenant datastore 109 can, for example, maintain records of information about current and/or past compute devices with which each compute device has interacted. In some implementations, the multi-tenant datastore 109 can also store, for example, the first service request having data values specified by the first compute device 112 and associated with fields and rules specified by the first compute device 112, the second service request having data values specified by the second compute device 122 and associated with the fields and rules specified by the second compute device 122. The rules specified by the first compute device 112 are not accessible to the second compute device 122. The rules specified by the second compute device 122 are not accessible to the first compute device 112.

The first compute device 112 can include a processor 113 and a memory 114 operatively coupled to the processor 113 that communicates with each other, and with other components, via a bus (not shown in FIG. 1). The bus can include any of several types of bus structures including, but not limited to, a memory bus, a memory controller, a peripheral bus, a local bus, and any combinations thereof, using any of a variety of bus architectures. The first compute device 112 can be structurally similar to the multi-tenant compute device 105 and can be used to implement a specially configured set of instructions to perform any one or more of the aspects and/or methodologies described herein.

The processor 113 of the first compute device 112 can be or include, for example, a hardware-based integrated circuit (IC), or any other suitable processing device configured to run and/or execute a set of instructions or code. For example, the processor 113 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 103 can be configured to run any of the methods and/or portions of methods discussed herein.

The memory 114 of the first compute device 112 can be or include, for example, a random-access memory (RAM), a memory buffer, a hard drive, a read-only memory (ROM), an erasable programmable read-only memory (EPROM), and/or the like. In some instances, the memory 114 can store, for example, one or more software programs and/or code that can include instructions to cause the processor 113 to perform one or more processes, functions, and/or the like. In some implementations, the memory 114 can include extendable storage units that can be added and used incrementally. In some implementations, the memory 114 can be a portable memory (e.g., a flash drive, a portable hard disk, and/or the like) that can be operatively coupled to the processor 113. The memory 114 can include various components (e.g., machine-readable media) including, but not limited to, a random-access memory component, a read only component, and any combinations thereof. In one example, a basic input/output system (BIOS), including basic routines that help to transfer information between components within the first compute device 112 such as during start-up, can be stored in memory 114. The memory 114 can further include any number of program modules including, for example, an operating system, one or more application programs, other program modules, program data, and any combinations thereof.

The first compute device 112 can include an export integrator 115 and an import integrator 116. The export integrator 115 can be or include a software/hardware component configured to provide authentication data (e.g., credentials) to the authenticator 106 of the multi-tenant computer system 102. The export integrator 115 can also be used to transmit the first service request to the multi-tenant compute device 105. The import integrator 116 can be or include a software/hardware component configured to receive a signal describing an event that indicates a conflict update. For instance, the import integrator 116 can ingest data received from the multi-tenant computer system 102. In some implementations, the import integrator 116 can also be configured to send a signal to the authenticator 106 describing identity verification of the first operator U1. In some implementations, the import integrator 116 can be configured to collect, ingest, and/or load data from the multi-tenant computer system 102.

A conflict update can be or include an indication of a priority for data values in a service request. In some instances, the service request can convey missing data to be added (e.g., a field with a missing data value), present data to be updated, present data to be removed, and/or the like. The conflict update can be integrated into the fields of the service request. For instance, the multi-tenant compute device 105 can experience a conflict based on multiple service requests that conflict with each other. The multi-tenant compute device 105 can produce a conflict update that indicates a priority to a service request such that the service request having a greater priority can be processed before service requests with lesser priority. The multi-tenant compute device 105 can transmit the conflict update to the compute device(s) involved in the conflict, indicating the priority for each service request involved in the conflict. The conflict update can be processed by an import integrator (e.g., import integrator 116 and/or import integrator 126) of a compute device (e.g., first compute device 112 and/or second compute device 122) involved in the conflict. For instance, the import integrator can integrate the conflict update into the fields associated with the service request. A system of record (e.g., system of record 117 and/or system of record 127) of the compute device can also record the conflict update integrated into the fields. In resolving a conflict, the multi-tenant compute device 105 can "pull" a conflict update from one service request that is to have a lower priority and/or "push" a conflict update to a service request that is to have a higher priority.

In some implementations, the import integrator 116 of the first compute device 112 can retrieve a signal of an event generated by the multi-tenant compute device 105 and describing a conflict update to be integrated to the fields associated with the first service request of the first compute device 112. In some cases, the conflict update can indicate that there is missing data to be added of the first service request, data to be updated, data to be removed, and/or the like. In some cases, the conflict update can indicate that the first service request is involved in a conflict and that a priority associated with the service request is to be applied to resolve the conflict. The memory 114 of first compute device 112 can also include, for example, a system of record 117.

In some implementations, a system of record can be or include a computer system or software designed to serve as a system of record (SOR) for that computer system or software (e.g., first compute device 112 and/or second compute device 122). In some implementations, the system of record can be or include authoritative source of information for a specific compute device and configured to provide accurate information involving that compute device and processes of that compute device. In some implementations, the system of record can be a native system of records. In some implementations, the system of record can include a database, repository, and/or datastore. In some implementations, the system of record can also include a database management system and/or database manager for that database, repository and/or datastore. In some implementations, the system of record can be responsible for data creation, updating, modifying and/or deleting.

For instance, the system of record 117 can be run on the first compute device 112 and configured to manage and/or store data specific to the first compute device 112. In some implementations, the system of record 117 can be or include an authoritative data source for the first compute device 117. In some implementations, the system of record 117 can be or include a data management system and can record any changes to the data values and/or fields associated with the first service request based on the conflict update. In some cases, the system of record 117 can be configured to store, process, and/or analyze any data collected, ingested, and/or loaded by the import integrator 116. In some implementations, the first operator U1 can manage access to multi-tenant computer system 102 via the system of record 117.

The second compute device 122 can include a processor 123 and a memory 124 operatively coupled to the processor 123 that communicates with each other, and with other components, via a bus (not shown in FIG. 1). The bus can include any of several types of bus structures including, but not limited to, a memory bus, a memory controller, a peripheral bus, a local bus, and any combinations thereof, using any of a variety of bus architectures. The second compute device 122 can be structurally similar to the multi-tenant compute device 105 and can be used to implement a specially configured set of instructions to perform any one or more of the aspects and/or methodologies described herein.

The memory 124 of the second compute device 122 can be or include, for example, a random-access memory (RAM), a memory buffer, a hard drive, a read-only memory (ROM), an erasable programmable read-only memory (EPROM), and/or the like. In some instances, the memory 124 can store, for example, one or more software programs and/or code that can include instructions to cause the processor 123 to perform one or more processes, functions, and/or the like. In some implementations, the memory 124 can include extendable storage units that can be added and used incrementally. In some implementations, the memory 124 can be a portable memory (e.g., a flash drive, a portable hard disk, and/or the like) that can be operatively coupled to the processor 123. The memory 124 can include various components (e.g., machine-readable media) including, but not limited to, a random-access memory component, a read only component, and any combinations thereof. In one example, a basic input/output system (BIOS), including basic routines that help to transfer information between components within the second compute device 122 such as during start-up, can be stored in memory 124. The memory 124 can further include any number of program modules including, for example, an operating system, one or more application programs, other program modules, program data, and any combinations thereof The second compute device 122 can include an export integrator 125 and an import integrator 116. The export integrator 125 can be or include a software/hardware component configured to provide authentication data (e.g., credentials) to the authenticator 106 of the multi-tenant computer system 102. The export integrator 125 of the second compute device 122 can also be used to transmit the second service request to the multi-tenant compute device 105. The import integrator 126 can be or include a software/hardware component configured to receive a signal describing an event that indicates a conflict update. For instance, the import integrator 126 can ingest data received form the multi-tenant computer system 102. In some implementations, the import integrator 126 can also be configured to send a signal to the authenticator 106 describing identity verification of the second operator U2. In some implementations, the import integrator 126 can be configured to collect, ingest, and/or load data from the multi-tenant computer system 102. In some cases, the system of record 127 can be configured to store, process, and/or analyze any data collected, ingested, and/or loaded by the import integrator 126.

In some implementations, the import integrator 126 of the second compute device 122 can retrieve a signal of an event generated by the multi-tenant compute device 105 and describing a conflict update to be integrated to the fields associated with the second service request of the second compute device 122. In some cases, the conflict update can indicate that there is missing data to be added of the second service request, data to be updated, data to be removed, and/or the like. In some cases, the conflict update can indicate that the first service request is involved in a conflict and that a priority associated with the service request is to be applied to resolve the conflict. The memory 124 of second compute device 122 can also include, for example, a system of record 127. The system of record 127 of the second compute device 122 can be or include a data management system and can record any changes to the data values and/or fields associated with the second service request based on the conflict update. For instance, the system of record 127 can be run on the second compute device 122 and configured to manage and/or store data specific to the second compute device 122. In some cases, the system of record 127 can be configured to store, process, and/or analyze any data collected, ingested, and/or loaded by the import integrator 126. In some implementations, the second operator U2 can manage access to multi-tenant computer system 102 via the system of record 127.

Figure 2A:
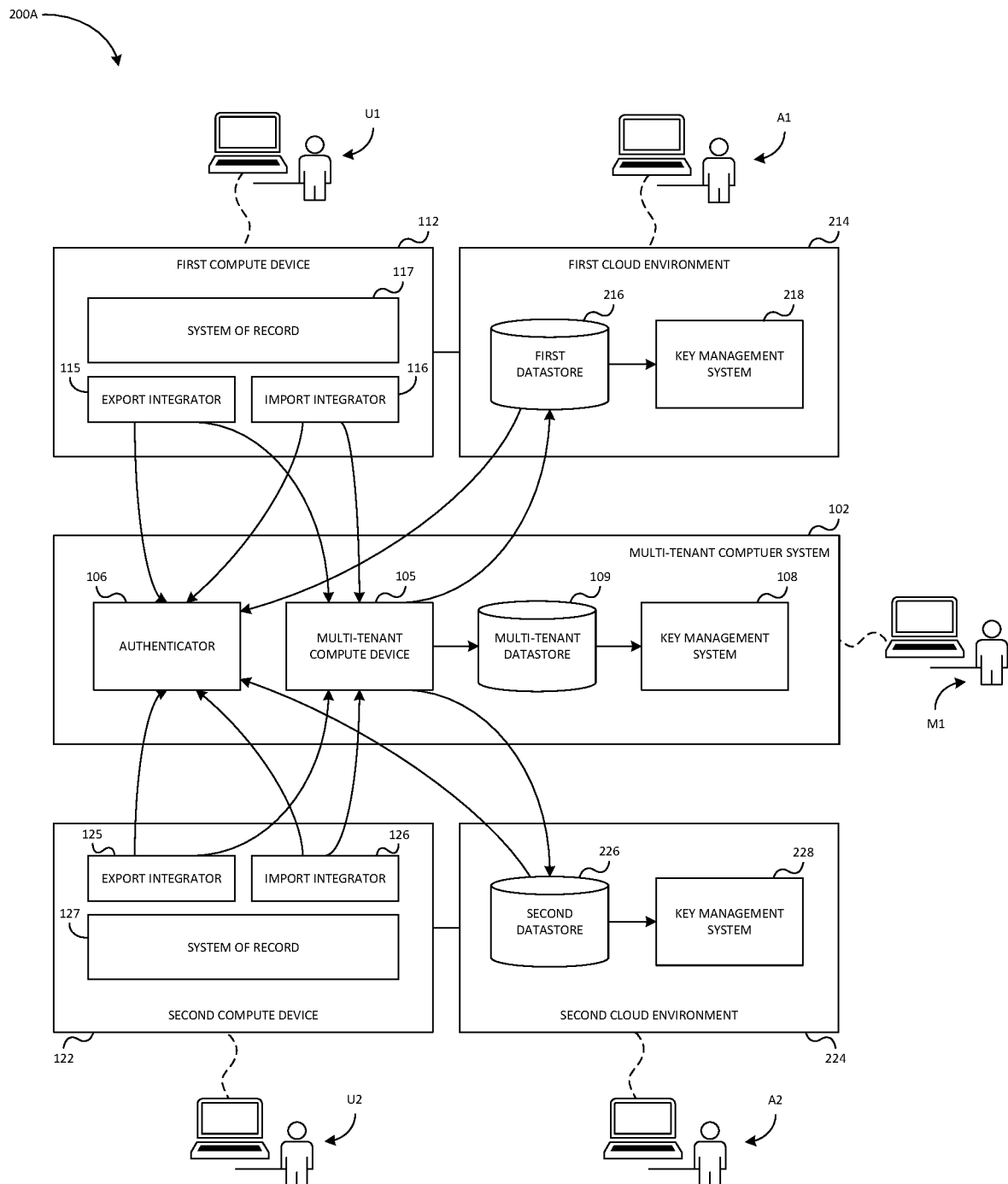
FIG. 2A-B are block diagrams of a multi-tenant computer system for producing service results by matching and resolving conflicts of service requests from client compute devices operated by administrators, according to one or more embodiments.
Figure 2B:
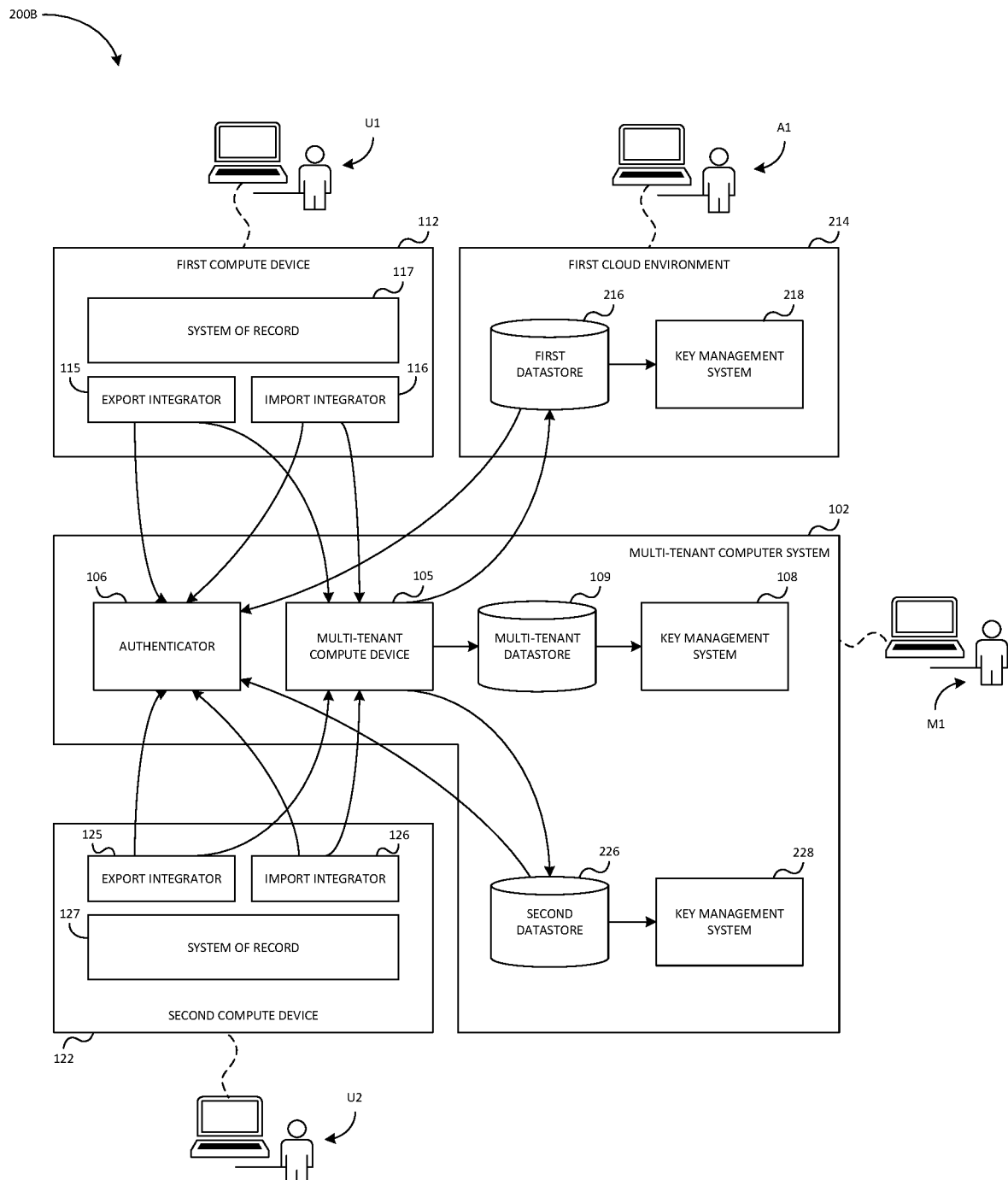

FIG. 2A-B are block diagrams of a multi-tenant computer system for producing service results by matching and resolving conflicts of service requests from client compute devices operated by administrators, according to one or more embodiments. FIG. 2A shows a system 200A for compute devices (e.g., first compute device 112 and second compute device 122) with data isolated from each other and/or the multi-tenant computer system 102. The system 200A includes the first compute device 112 operated by the first operator U1, a first cloud environment 214 operated by a first administrator A1, the second compute device 112 operated by the second operator U2, a second cloud environment 224 operated by a second administrator A2, and the multi-tenant computer system 102 operated by the multi-tenant operator M1. In some implementations, the first administrator A1 and/or the second administrator A2 can be, for example, a human administrator and/or an automated administrator The first cloud environment 214 can be associated with the first compute device 112 and the multi-tenant computer system 102. A cloud environment can be associated with the multi-tenant computer system 102 and controlled by a compute device (e.g., the first compute device 112 and/or the second compute device 122) and/or the operator of the compute device (e.g., the first operator U1 and/or the second operator U2). For instance, a cloud environment can be operated by a compute device such that the compute device can store data in the cloud environment, which can be isolated from other cloud environments, including the multi-tenant computer system 102. The compute device can choose to operate the cloud environment and manage/store data at the cloud environment. In some cases, the compute device can enable the multi-tenant computer system 102 to manage the cloud environment and/or implement the cloud environment. In some cases, the compute device can choose to not manage/operate the cloud environment, enabling the multi-tenant computer system 102 to manage data of that compute device. In some cases, the compute device can revoke access of the cloud environment, preventing the multi-tenant computer system 102 from managing/operating that cloud environment.

In some implementations, the cloud environment can be or include, for example, a virtualized computing environment that allows users (e.g., first operator U1, second operator U2, first administrator A1, second administrator 222, etc.) to access and use shared data over a network, such as, for example, storage, processing power, applications, and/or the like. In the cloud environment, an underlying infrastructure is managed and/or maintained by an administrator (e.g., first administrator A1 and/or second administrator A2, allowing users to access and use resources (e.g., datastores, key management systems, etc.) on demand. This is so, at least in part, that users do not have to worry about procuring and maintaining their own hardware and software, and can instead focus on using the resources at the cloud environment (e.g., the first cloud environment 214 and/or the second cloud environment 224) to run applications and/or services. In some implementations, the cloud environment can use a network of remote servers to store, process, and/or manage data, with the user accessing the data via the Internet. In some implementations, the cloud environment can be or include, for example, public clouds, private clouds, hybrid clouds, and/or the like.

In some implementations, the first cloud environment 214 can be specific to the first compute device 112 and include a first datastore 216 that stores data from the multi-tenant computer system 102 (or transmit data to the multi-tenant computer system 102) and a key management system 218 that stores cryptographic/encryption keys generated by the multi-tenant computer system 102. The first cloud environment 214 can be isolated from the second compute device 122 and the second cloud environment 224. In some cases, the first cloud environment 214 can be isolated from the multi-tenant computer system 102. The first cloud environment 214 can give the multi-tenant computer system 102 permission, which can be revoked at any time, to access the first cloud environment 214.

The key management system 218 of the first cloud environment 214 can revoke access of the cryptographic/encryption key from the multi-tenant computer system 102 at any time. Similarly, the second cloud environment 224 can be specific to the second compute device 122 and include a second datastore 226 that stores data from the multi-tenant computer system 102 (or transmit data to the multi-tenant computer system 102) and a key management system 228 that stores cryptographic/encryption keys generated by the multi-tenant computer system 102. The key management system 228 of the second cloud environment 224 can revoke access of the cryptographic/encryption key from the multi-tenant computer system 102 at any time. The second cloud environment 224 can be isolated from the first compute device 112 and the first cloud environment 214. In some cases, the second cloud environment 224 can be isolated from the multi-tenant computer system 102. The second cloud environment 224 can give the multi-tenant computer system 102 permission, which can be revoked at any time, to access the second cloud environment 224.

For instance, the first operator U1 can choose to operate the first cloud environment 214 and manage the data associated with the first operator U1. The first operator U1 can configure the first cloud environment 214 to be compatible with the multi-tenant computer system 102 by authorizing the multi-tenant computer system 102 to configure the first cloud environment 214, via the first administrator A1, in place of the first operator U1. In some cases, the first operator U1 can authorize the first administrator A1 and/or the multi-tenant operator M1 to manage the data of the first compute device 112, eliminating a need for the first cloud environment 214. For example, credentials authorizing the first administrator A1 and/or the multi-tenant operator M1 can enable the first administrator A1 and/or the multi-tenant operator M1 to access the first datastore 216 and/or the key management system 218 of the first cloud environment 214, to use the key management system 218 of the first cloud environment 214 to encrypt/decrypt encryption keys for a first service request by first compute device 112, and/or the like. In some implementations, the first datastore 216 and/or the second datastore 226 can be configured to be isolated behind an API that enables the performance of key management functions, authentication, and/or interactions with the multi-tenant datastore 109. In some cases, the multi-tenant datastore 109 can also performs key management functions, authentication, and/or interactions with other datastore such as, for example, the first datastore 216 and/or the second datastore 226. In some implementations, the first operator U1 can manage access to multi-tenant computer system 102 and/or the first datastore 216 via the system of record 117.

In some implementations, the multi-tenant computer system 102 can manage user information of the first operator U1 (e.g., credentials). At the multi-tenant computer system 102, the multi-tenant compute device 105 can merge the data values of the first service request from the first compute device 112 and the data values of the second service request from the second compute device 122 to produce a set merged data values. For instance, the multi-tenant compute device 105 can merge data from multiple connected compute devices (e.g., first compute device 112, second compute device 122, etc.). Merging of the data values can be performed based on availability of data within service requests (e.g., first service request, second service request, etc.) and priorities of fields in the service requests. In some cases, the first service request can be an initiated or pre-existing service request from the first operator U1 to exchange information with the second operator U2. In some cases, the second service request can be an initiated or pre-existing service request from the second operator U2 to exchange information with the first operator U1, or with another operator different from the first operator U1. In some implementations, the multi-tenant compute device 105 can transmit a signal of a transaction update that describes differences in data values and/or fields between the first service request and the second service request to the first compute device 112 and the second compute device 122. In some cases, the transaction updates can convey, for example, missing data to be added, current data to be updated, current data to be removed, service results multiple compute devices can be merged, and/or the like. In some implementations, the second operator U2 can manage access to multi-tenant computer system 102 and/or the second datastore 226 via the system of record 127.

In some implementations, merging the data values of the first service request and the data values of the second service request can include, for example, collecting, synchronizing, and/or collecting shared data (e.g., documents, user data, etc.). In some cases, the multi-tenant compute device 105 can merge the data values of the first service request and the data values of the second service request with previous service requests sent by the first compute device 112, second compute device 122, and/or other compute devices from previous transactions. In some implementations, the multi-tenant compute device 105 can filter, at the multi-tenant computer system 102, the set of merged data values based on a rules specified by the first compute device 112 (or the first operator U1) to produce a first filtered result. The rules specified by the first compute device 112 are also inaccessible to the second compute device 122 (or the second operator U2).

In some implementations, the rules set by the first operator U1 operating the first compute device 112 and/or the second operator U2 operating the second compute device 122 can be, for example, locality rules (e.g., "we work with Company A on refinance transactions in California only"), temporal rules (e.g., "we work with Company B during summer months"), transaction distribution rules (e.g., "we give Company A 60% of our business and Company B the remaining 40%"), transaction type (e.g., "we work with Company A on refinance transactions, but not equity transactions"), and/or the like.

In some implementations, the multi-tenant compute device 105 can also send, from the multi-tenant computer system 102 and to the first compute device 112 and the second compute device 122, a service result that is responsive to the second service request and that includes the first filtered result. The service result also does not include remaining merged data values from the set of merged data values. The multi-tenant compute device 105 can also filter, at the multi-tenant computer system 102, the set of merged data values based on the rules specified by the second compute device 122 to produce a second filtered result. The rules specified by the second compute device 122 can also be inaccessible to the first compute device 112 (or the first operator U1).

In some implementations, the multi-tenant compute device 105 can send, from the multi-tenant computer system 102 and to the first compute device 112 and the second compute device 122, a service result that is responsive to the first service request and that includes the second filtered result and not remaining merged data values from the set of merged data values.

In some implementations, the multi-tenant compute device 105 can also store, at a volatile, non-persistent memory of the multi-tenant computer system 102, the data values specified by the first compute device 112, the rules specified by the first compute device 112, the data values specified by the second compute device 122, and the rules specified by the second compute device 122. A non-persistent memory can be, for example, a type of memory that is volatile such that the memory loses data when a connected power supply (or network) is removed, disconnected, and/or the like. In some cases, the volatile, non-persistent memory can be, for example, random access memory (RAM) and used to store data and programs while in use by the multi-tenant compute device 105 at the multi-tenant computer system 102. In some instances, when the multi-tenant compute device 105 is powered off, data stored in RAM can be lost. The rules specified by the first compute device 112 and the rules specified by the second compute device 122 can be controlled, filtered, and/or processed by their respective owners.

In some implementations, the data values specified by the first compute device 112 can be stored at a memory separate from and inaccessible to the second compute device 122 such as, for example, the first datastore 216 at the first cloud environment 214. In some implementations, the data values specified by the second compute device 123 can be stored at a memory separate from and inaccessible to the first computer device 112 such as, for example, the second datastore 226 at the second cloud environment 224. In some implementations, the data values specified by the first compute device 112 can be stored at a memory accessible to the multi-tenant computer system 102 and associated with a single-tenant account of the multi-tenant computer system 102. For instance, the first operator U1 can own a single-tenant account associated with the multi-tenant computer system 102 to store the data values of the first service request of the first compute device 112 at the multi-tenant datastore 109 (in response to giving access to the multi-tenant computer system 102 to control the data values of the first service request of the first compute device 112). Similarly, the second operator U2 can own and/or manage a single-tenant account associated with the multi-tenant computer system 102 to store the data values of the second request of the second compute device 122 at the multi-tenant datastore 109. In other words, the multi-tenant computer system 102 can maintain access to data of an operator in a secure and volatile mechanism. In some implementations, the multi-tenant computer system 102 can receive authorization to access data from a compute device via authorized API endpoints. The compute device can revoke access to the data of the compute device at any time (e.g., in a "break-glass" fashion).

FIG. 2B shows a system 200B with the second operator U2 giving access of the second datastore 226 and the key management system 228 to the multi-tenant computer system 102 operated by the multi-tenant operator M1. In some cases, the second operator U2 can choose to operate the second cloud environment 224 and manage the data associated with the second operator U2. The second operator U2 can choose to not configure a second cloud environment and instead authorize the multi-tenant computer system 102 to manage the second datastore 226 and/or the key management system 228. In some cases, the second operator U2 can authorize a second administrator (not shown in FIG. 2B) and/or the multi-tenant operator M1 to manage the data of the second compute device 122, eliminating a need for a second cloud environment. For example, credentials authorizing the second administrator and/or the multi-tenant operator M1 can enable the second administrator A2 and/or the multi-tenant operator M1 to access the second datastore 226 and/or the key management system 228 associated with the second compute device 122, to use the key management system 228 to encrypt/decrypt encryption keys for the second service request, and/or the like.

Figure 3:
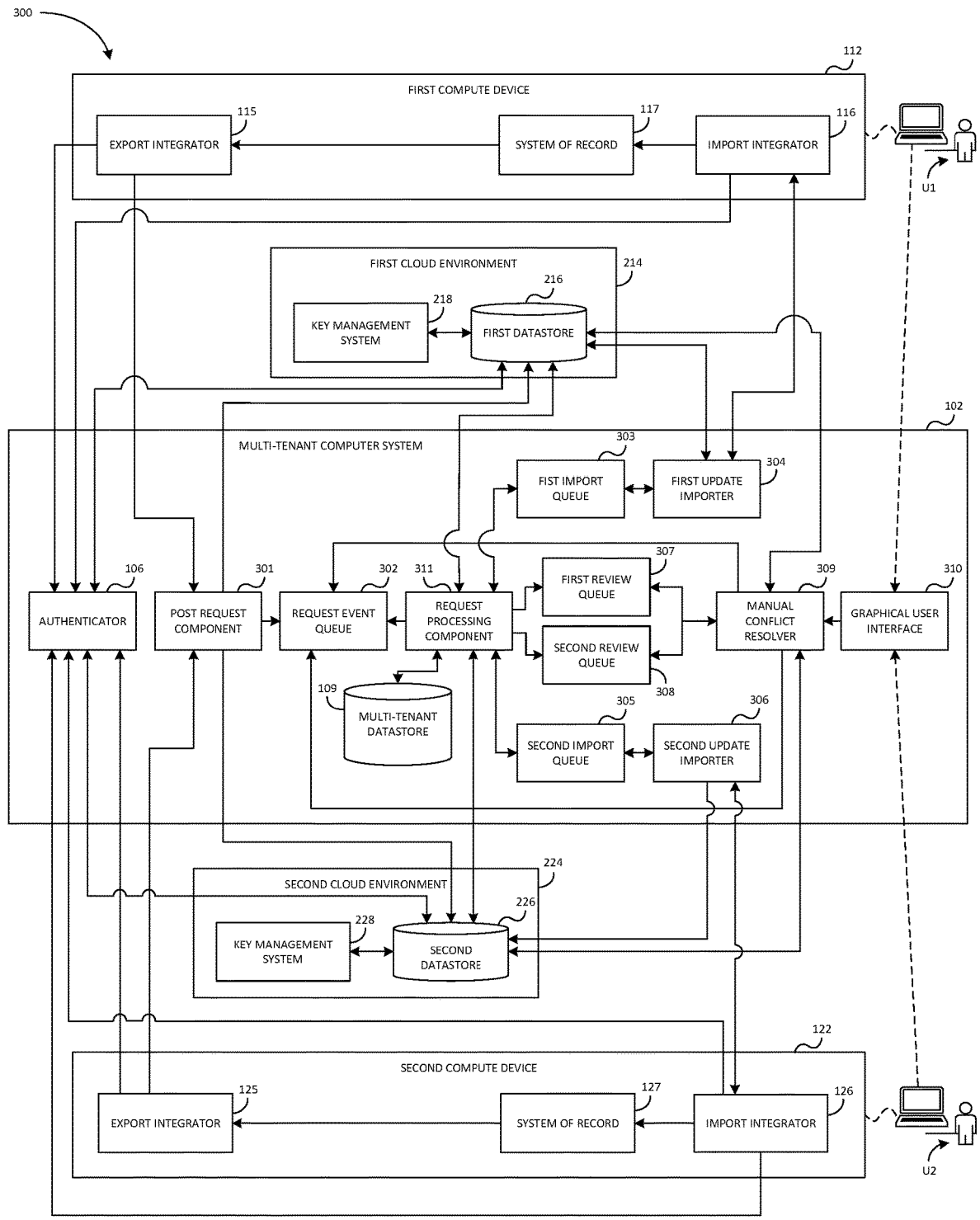
FIG. 3 is a flow diagram of a system for a multi-tenant computer system for producing service results by matching and resolving conflicts of service requests from client compute devices isolated from the multi-tenant computer system, according to one or more embodiments.

FIG. 3 is a flow diagram of a system 300 for a multi-tenant computer system 102 for producing service results by matching and resolving conflicts of service requests from client compute devices (e.g., the first compute device 112 and the sec and/or the second compute device 122) isolated from the multi-tenant computer system 102, according to one or more embodiments. The system includes the first compute device 112 operated by the first operator U1, the first cloud environment 214 operated by the first administrator (not shown in FIG. 3), the multi-tenant computer system 102, the second cloud environment 224 operated by the second operator (not shown in FIG. 3), and/or the second compute device 122 operated by the second operator U2.

The multi-tenant computer system 102 can include components (or components representing processes of the multi-tenant computer system 102 and/or the multi-tenant compute device 105) such as, for example, the authenticator 106, a post request component 301, a request event queue 302, a request processing component 311, the multi-tenant datastore 109, a first import queue 303, a first update importer 304, a second import queue 305, a second update importer 306, a first review queue 307, a second review queue 308, a manual conflict resolver 309, a GUI 310, and/or the like. In some implementations, the system 300 as shown can be a high-level architecture of the multi-tenant computer system 102 and the multi-tenant compute device of FIG. 1 or FIG. 2A-B, where the multi-tenant compute device includes the post request component 301, the request event queue 302, the request processing component 311, the first import queue 303, the first update importer 304, the first review queue 307, the second review queue 308, the second import queue 305, the second update importer 306, the manual conflict resolver 309, and/or the GUI 310.

The first compute device 112 includes the import integrator 116, the system of record 117 and/or the export integrator 115 of FIG. 1 or FIG. 2A-B. The import integrator 116 of the first compute device 112 can receive a signal describing an event indicating a conflict update generated by the multi-tenant compute device 105. The conflict update can be, for example, a push update from the first update importer 304 in response to the multi-tenant computer system 102 receiving, at the second update importer 306, conflict update pulled from the import integrator 126 of the second compute device 122). The conflict update can be integrated into the system of record 117 of the first compute device 112. The import integrator 116 of the first compute device 112 can also import the conflict update into the fields of the data values of the first service request of the first compute device 112, where the fields are stored in the system of record 117 of the first compute device 112. The export integrator 115 can receive an authentication token from the authenticator 106 and transmit to the multi-tenant computer system 102 to authorize the first compute device 112. The authentication token can be previously generated by the multi-tenant computer system 102 and obtained from the multi-tenant computer system 102. The export integrator 115 of the first compute device 112 can also transmit the first service request to the post request component 301 of the multi-tenant computer system 102. The first cloud environment 214 can include the key management system 218 and the first datastore 216. The key management system 218 can retrieve and/or store encryption keys from the first datastore 216 and/or generated by the multi-tenant computer system 102.

The second compute device 122 includes the import integrator 126, the system of record 127 and/or the export integrator 125 of FIG. 1 or FIG. 2A-B. The import integrator 126 of the second compute device 122 can receive a signal describing an event indicating a conflict update generated by the request processing component 311 of the multi-tenant computer system 102. The conflict update can be, for example, a pull update to be integrated into the system of record 127 of the second compute device 122. The pull update can be sent from the import integrator 126 of the second compute device 122 to the second update importer 306 at the multi-tenant computer system 102, such that the multi-tenant computer system 102 can transmit a push request from the first update importer 304 to the import integrator 116 at the first compute device 112. In some implementations the import integrator 126 of the second compute device 122 can also import the conflict update into the fields of the data values of the second service request of the second compute device 122, where the fields are stored in the system of record 127 of the second compute device 122. The export integrator 125 and/or the import integrator 126 can transmit an authentication token associated with the second compute device 122 to the authenticator 106 at the multi-tenant computer system 102 to authorize the second compute device 122. The authentication token can be previously generated by the multi-tenant computer system 102 and obtained from the multi-tenant computer system 102. The export integrator 125 of the second compute device 122 can also transmit the second service request to the post request component 301 of the multi-tenant computer system 102. The second cloud environment 224 can include the key management system 228 and the second datastore 226. The key management system 228 can retrieve and/or store encryption keys from the second datastore 226 and/or generated by the multi-tenant computer system 102. In some implementations, the second operator U2 can give access of the second cloud environment 224 to the multi-tenant computer system 102 such that the multi-tenant computer system 102 has control over the key management system 228 and the second datastore 226 associated with the second compute device 122.

The post request component 301 can generate an event. In some cases, the event can be a signal indicating a trigger of a processing of received service requests. In some implementations, the post request component 301 can also transmit the event to the first datastore 216 at the first cloud environment 214 and to the second datastore 226 at the second cloud environment 224. The post request component 301 can also transmit the event to the request event queue 302. In some implementations, the request event queue 302 can be, for example, configured to prioritize processing of service requests received from multiple compute devices. For example, service requests can be timestamped by the post request component 301 in the order received. In some implementations, the request event queue 302 can include pointers to data values contained in the first datastore 216 and/or the second datastore 226. The request event queue 302 can also consume an event generated by the request processing component 311 and/or the manual conflict resolver 309. In some cases, the event can describe a processing of service requests based on factors such as, for example, conflicts between service requests, order of receiving service requests, and/or the like. In some implementations, each of the request event queue 302, the first review queue 307, and/or the second review queue 308 can include pointers to items in the multi-tenant datastore 109. The items in the multi-tenant datastore 109 can include, for example, the first service request, the second service request, any previous service requests, shared rules, shared fields, shared data values, user information, and/or the like.

The request processing component 311 can be based on serverless cloud computing services of the multi-tenant computer system 102 and ensures data consumed for processing from the first datastore 216 and/or the second datastore 226 remains transient, encrypted, and/or maintained in volatile, non-persistent memory (e.g., RAM) within the multi-tenant computer system 102. In some implementations, the request processing component 311 can also send the first service request generated by the first compute device 112 to the first datastore 216 at the first cloud environment 214. Similarly, the request processing component 311 can send the second service request generated by the second compute device 122 to the second datastore 226 at the second cloud environment 224.

The request processing component 311 can be configured to generate an event describing a conflict update to the first import queue 303. The conflict update can be, for example, a push update (e.g. a conflict update pulled from the import integrator 126 of the second compute device 122) to be integrated into the system of record 117 of the first compute device 112. The first import queue 303 can be configured to receive the event describing the conflict update from the request processing component 311 and/or from the first update importer 304. Similarly, the request processing component 311 can be configured to generate an event describing a conflict update to the second import queue 305. The conflict update can be, for example, a pull update (e.g. a conflict update pulled from the import integrator 126 of the second compute device 122) to be integrated into the system of record 117 of the first compute device 112. In some cases, the conflict update including the pull update can also be integrated into the system of record 127 of the second compute device 112. The second import queue 305 can be configured to receive the event describing the conflict update from the request processing component 311 and/or from the second update importer 306.

In some implementations, the request processing component 311 can be configured to generate an event describing a conflict to the first review queue 307 and/or the second review queue 308. The event describing the conflict can indicate missing data to be added of the first service request and/or the second service request, data to be updated, data to be removed, and/or the like. In some cases, the first review queue 307 and/or the second review queue 308 can be configured to process multiple events describing conflicts to resolve them in an order based on priority.

In some implementations, the manual conflict resolver 309 can be configured to resolve conflicts between the first service request and the second service request, generate events causing the post request component 301 to process the first service request and the second service request. In some implementations the manual conflict resolver 309 can be configured to generate the event describing the conflict to the first review queue 307 and the second review queue 308. In some cases, the manual conflict resolver 309 can be operated via the GUI 310 and by the first operator U1 and/or the second operator U2. For instance, the conflict(s) can be resolved manually via the GUI 310.

In some implementations, the first datastore 216 at the first cloud environment 214 can receive, from the request processing component 311 at the multi-tenant computer system 102, the first service request generated by the first compute device 112, an update for a conflict resolution involving the first service request, a priority scheme, and/or a request filter. In some cases, the first datastore 216 can receive the first service request and the update for the conflict resolution from the manual conflict resolver 309 at the multi-tenant computer system 102. The priority scheme for the first datastore 216 can be defined by the first compute device 112 and for each field from the fields associated with the data values of the first service request. The priority scheme can be applied to the first service request and, when processed by the request processing component 311, a conflict can be generated based on the priority scheme and/or rules associated with the first service request for linking service requests. In some cases, prioritization can be further granularized within a level using a priority score that can be used to compare data with another service request having same priority that can otherwise result in generating the conflict. The request filter can be used to decouple rules and processing logic in identifying information that can or cannot be accessible to the second compute device 122 (or other compute devices). For instance, the request filter can use the rules provided by the first compute device 112 to implement policies for sharing data. The rules can be used to generate filter templates. For instance, the request processing component 311 can produce a first filtered results based on the request processing component 311 processing the first service request and the second service request and using a filter template. In some implementations, the first datastore 216 at the first cloud environment 214 can receive, from the request processing component 311, a signal indicating a conflict update to be applied to fields associated with the data values of the first service request based on the conflict (or resolution of the conflict). In some cases, the first datastore 216 can receive the signal indicating the conflict update and the first service request from the first update importer 304.

Similarly, in some implementations, the second datastore 226 at the second cloud environment 224 can receive, from the request processing component 311 at the multi-tenant computer system 102, the second service request generated by the second compute device 122, an update for a conflict resolution involving the second service request, a priority scheme, and/or a request filter. In some cases, the second datastore 226 can receive the second service request and the update for the conflict resolution from the manual conflict resolver 309 at the multi-tenant computer system 102. The priority scheme for the second datastore 226 can be defined by the second compute device 122 and for each field from the fields associated with the data values of the second service request. The priority scheme can be applied to the second service request and, when processed by the request processing component 311, a conflict can be generated based on the priority scheme and/or rules associated with the second service request for linking service requests. In some cases, prioritization can be further granularized within a level using a priority score that can be used to compare data with another service request having same priority that can otherwise result in generating the conflict. The request filter can be used to decouple rules and processing logic in identifying information that can or cannot be accessible to the second compute device 122 (or other compute devices). For instance, the request filter can use the rules provided by the second compute device 122 to implement policies for sharing data. The rules can be used to generate filter templates. For instance, the request processing component 311 can produce a second filtered results based on the request processing component 311 processing the first service request and the second service request and using a filter template. In some implementations, the second datastore 226 at the second cloud environment 224 can receive, from the request processing component 311, a signal indicating a conflict update to be applied to fields associated with the data values of the second service request based on the conflict (or resolution of the conflict). In some cases, the second datastore 226 can receive the signal indicating the conflict update and the second service request from the second update importer 306.

In some implementations, processes of the multi-tenant computer system 102 can be based on serverless cloud computing services to ensure data consumed for processing (e.g., service requests) from the first datastore 216 controlled by the first operator U1 and/or the second datastore 226 controlled by the second operator U2 remains transient and/or encrypted as data transfers to/from the first datastore 216 and/or the second datastore 226. The data can be stored in the multi-tenant datastore 107 where the multi-tenant datastore 107 can be a volatile, non-persistent memory (RAM). In some implementations, the multi-tenant datastore 107 does not store data from the first operator U1 and/or the second operator U2 unless authorized by the first operator U1 and/or the second operator U2.

Figure 4:
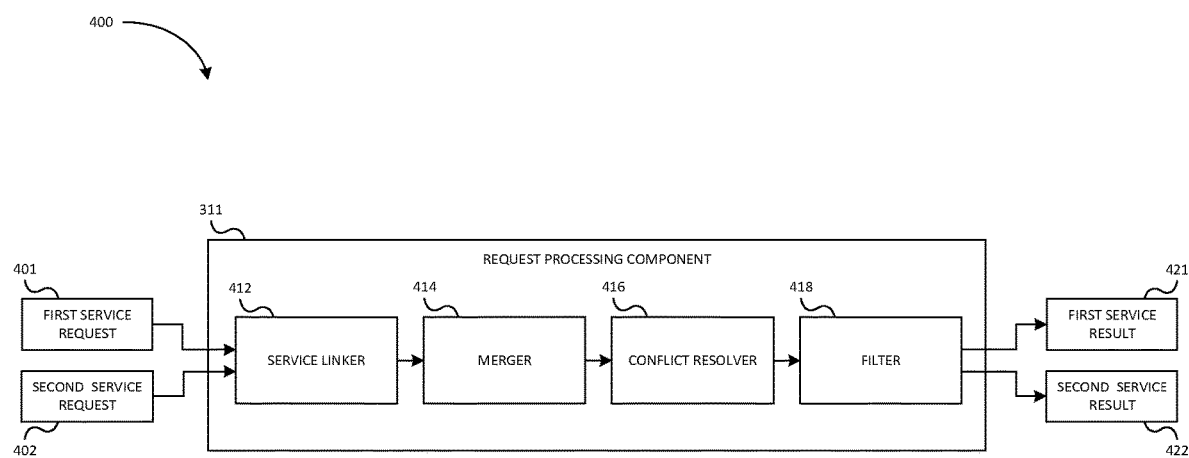
FIG. 4 is a flow diagram of a system for resolving conflicts at a multi-tenant computer system to resolve conflicts.

FIG. 4 is a flow diagram of a system 400 for resolving conflicts at a multi-tenant computer system (not shown in FIG. 4) to resolve conflicts, according to one or more embodiments. The system 400 can include the request processing component 311 from FIG. 3. The request processing component 311 can receive a first service request 401 and the second service request 402 and generate a first service result 421 and a second service result 422. The request processing component 311 can include, for example, a service linker 412, a merger 414, a conflict resolver 416, and a filter 418.

The service linker 412 can be configured to link the first service request 401 to an existing service request based on an identifier of a first operator (e.g., a collaborator) and/or a first compute device operator by the first operator (not shown in FIG. 4) that the first service request 401 originated from and/or data values and/or fields associated with the first service request 401. In some cases, the operator can also be referred to as a "collaborator." The service linker 412 can also be configured to link the second service request 402 based on an identifier of a second operator (e.g., a collaborator) and/or a second compute device operated by a second operator (not shown in FIG. 4) that the second service request 402 originated from and/or data values and/or fields associated with the second service request 402. In some implementations, the service linker 412 can also be configured to generate new service requests. In some cases, the identifier of the first operator and/or the second operator can include user data such as, for example username and password, biometric factors, hardware-based tokens (e.g., authentication tokens), and/or the like. In some implementations, the service linker 412 can be or include an assembler configured to convert some non-recognizable language from the first service request 401 and/or the second service request 402 into machine-readable language. This is so, at least in part, for the request processing component 311 to ensure that each service request (e.g., first service request 401 and/or second service request 402) can be processed correctly and securely on shared resources.

In some implementations, the request processing component 311 located at the multi-tenant computer system, via the service linker 412, can identify the first service request 401 and the second service request 402 being related based on the identifier of the first compute device operated by the first operator and associated with the first service request 401 and the data values specified by the first compute device. In some implementations, the request processing component 311 can also identify the first service request 401 and the second service request 402 being related based on the identifier of the second compute device operated by the second operator and associated with the second service request 402 and the data values specified by the second compute device.

The merger 414 can be configured to collect, synchronize, and/or collate data from the first compute device and/or the second compute device shared with the multi-tenant computer system in response to the first service request 401 and the second service request 402 being identified as related. The merger 414 of the request processing component 311 at the multi-tenant computer system can be configured to merge the data values of the first service request and the data values of the second service request to produce a set of merged data values. In some implementations, at the merger 414, conflicts can occur and/or be identified.

The conflict resolver 416 can identify conflicting data between the first service request 401 and the second service request 402 from the set of merged data values in response to the first service request 401 and the second service request 402 being related. In some implementations, the conflict resolver 416 can resolve conflicts within the set of merged data values to produce merged data with resolved conflicts. In some implementations, the request processing component 311 can apply previously generated resolutions to resolve the conflict between the first service request 401 and the second service request 402.

In some instances, a data value from the data values of the first service request 401 can be associated with a first field from the fields (associated with the first service request 401) corresponding with a data value from data vales of the second service request 402 and associated with the first field. In some instances, a data value from the data values of the first service request 401 can be associated with a second field from the fields (associated with the first service request 401) can differ with a data value from the data values of the second service request 402 and associated with the second field. In some implementations, the merger 414 can be caused to select the data value for the first service request 401 and associated with the second field and not select the data value for the second service request 402 and associated with the second field, in response to a priority defined by the first operator of the first compute device. The priority can be for the data value for the first service request 401 and associated with the second field being greater than a priority defined by the second operator of the second compute device. In some cases, the first operator and the second operator can have some data that are the same and some data that are different. The conflict resolver 416 can transmit data that the first operator does not have to the first operator and data that the second operator does not have to the second operator.

In some implementations, conflicts can be generated during a priority merge process and resolved manually by an authorized operator (e.g., first operator and/or second operator). In some cases, previously resolved conflicts can be subtracted from newly generated conflicts. In some implementations, resolutions used to resolve previous conflicts that are no longer needed can be dissolved so that future conflicts can be generated.

In some instances, a new conflict can be received at the conflict resolver 416 where no resolution exists for that new conflict. The new conflict remains and the multi-tenant computer system can load a resolution from a set of resolutions to apply to the new conflict to resolve the new conflict. In some cases, the resolution does not resolve the conflict as the resolution as the new conflict is unknown to the set of resolutions. In some cases, the new conflict can be resolved via manual intervention by the authorized operator.

In some instances a pre-existing conflict can be received at the conflict resolver 416. In some cases, the pre-existing conflict can be any conflict that was previously generated and/or detected. In some cases, no resolution exists to resolve the pre-existing conflict. As such, the pre-existing conflict can remain until manually resolved and/or a resolution is generated to resolve the pre-existing conflict.

In some instances, a new conflict can be received at the conflict resolver 416 where a resolution from the set of resolutions exists to resolve the conflict. As such, the conflict can be resolved and that resolution can be maintained to resolve similar conflicts.

The filter 418 of the request processing component 311 at the multi-tenant computer system can be configured to, in response to the first service request 401 an the second service request 402 being identified as related, filter the set of merged data values (or merged data with resolved conflicts) based on rules specified by the first compute device to produce a first filtered result (e.g., first service result 421) after resolving the conflicts. The rules specified by the first compute device can be inaccessible to the second compute device. The filter 418 can also be configured to filter the set of merged data values (or merged data with the resolved conflicts) based on rules specified by the second compute device to produce a second filtered result (e.g., second service result 422) after resolving the conflicts. The rules specified by the second compute device can be inaccessible to the first compute device. In some implementations, the filter 418 can be caused to filter the set of merged data values based on the rules specified by the second compute device being performed in response to identifying the first service request 401 and the second service request 402 being related.

In some implementations, the request processing component 311 can be configured to send a first portion of merged data with resolved conflicts to the second compute device and to the first compute device to cause the first compute device to update the data values specified by the first compute device, based on the first portion of the merged data with resolved conflicts. In some cases, the first portion of merged data with resolved conflicts can be sent as a conflict update. The request processing component 311 can also send a second portion of the merged data with resolved conflicts to the first compute device and to the second compute device to cause the second compute device to update the plurality of data values specified by the second compute device based on the second portion of the merged data with resolved conflicts. In some cases, the second portion of merged data with resolved conflicts can be sent as a conflict update. In some cases, the second portion of the merged data with resolved conflicts can be different than the first portion of the merged data with resolved conflicts.

In some implementations, the filter 418 can apply filters to any data values from any service requests. In some cases, the first service request 401 can indicate a transaction from the first compute device being a sender and a second compute device being a recipient of the transaction, where the second service request 402 can request to be the recipient to the first compute device. The first operator can set rules authorizing what data that the second compute device can access and/or receive. For instance, the first service request 401 can include data to be transferred from the first compute device to the second compute device. The data can include, for example, data that the second operator (operating the second compute) device does not have. For example, the data that can be transferred can include information about a buyer such as a first name, a last name, and a social security number. The first operator, however, can select the social security number to remain hidden and/or inaccessible to the second operator. The first compute device can provide a filter template from a first datastore (not shown in FIG. 4) controlled by the first operator to the filter 418 to enable a subset of the data to be sent to the second compute device. The first operator can authorize the multi-tenant computer system to access the filter template. The filter template can enable data excluding the social security number to be sent to the second compute device.

In some implementations, the request processing component 311 can be configured to send the first service result 421 and to the first compute device and the second compute device, where the first service result 421 is responsive to the first service request 401 and includes the second filtered result and not remaining merged data values from the set of merged data values. In some implementations, the request processing component 311 can be configured to send the service result that is responsive to the second service request 402 and that includes the first filtered result and not remaining merged data values from the set of merged data values.

In some implementations, the first operator can generate filter templates and manage the filter templates in a first datastore (not shown in FIG. 4) associated with the first operator and/or the first compute device. Similarly, the second operator can generate filter templates and manage the filter templates in a second datastore (not shown in FIG. 4) associated with the second operator and/or the second compute device. In some implementations, filter templates can be used to resolve conflicts by removing data to be sent from one compute device to another compute device that could cause a conflict. In some implementations, the filter templates can be accessed from datastores controlled by operators and/or administrators and processed in non-volatile, persistent memory of the multi-tenant computer system while rules can be stored in volatile, non-persistent memory of the multi-tenant computer system. In some cases, filter templates of each operator can be inaccessible to other operators.

Figure 5:
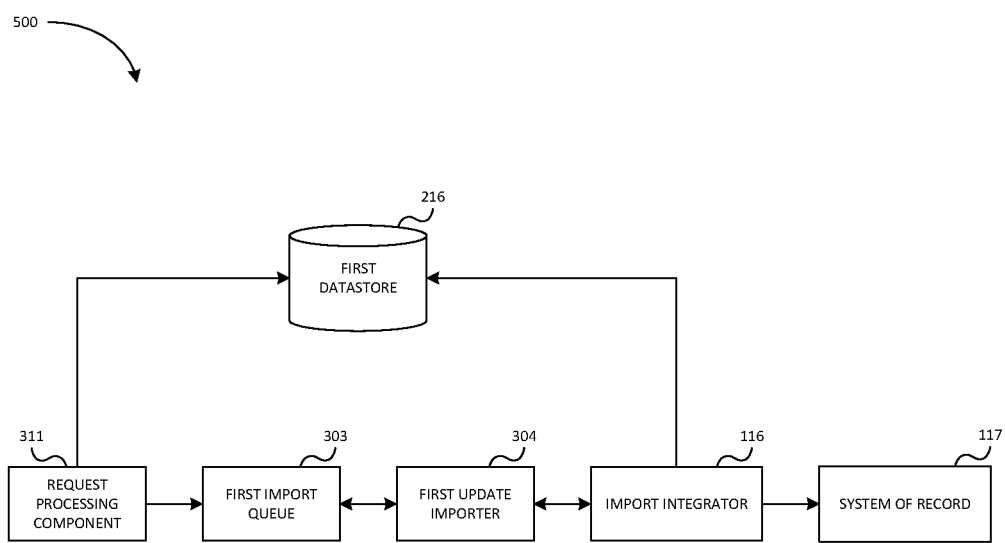
FIG. 5 is a flow diagram of a system for processing conflict updates, according to one or more embodiments.

FIG. 5 is a flow diagram of a subsystem 500 of the system 300 of FIG. 3 where the subsystem 500 is a representation of a portion of the system 300 for processing conflict updates, according to one or more embodiments. The portion of the system 300 can include, for example, the request processing component 311, the first import queue 303, the import integrator 116 of the first compute device of FIG. 1 or FIGS. 2A-B, the system of record 117 of the first compute device of FIG. 1 or FIGS. 2A-B, and the first datastore 216 of the first cloud environment of FIGS. 2A-B or FIG. 3.

The conflict update can be, for example, a push update to be integrated into the system of record 117 of the first compute device. An import integrator 116 of the first compute device can also import the conflict update into the fields of the data values of the first service request of the first compute device, where the fields are stored in the system of record 117 of the first compute device. An export integrator at the first compute device can transmit an authentication token to the authenticator at the multi-tenant computer system to authorize the first compute device.

In some implementations, the request processing component 311 can be configured to generate an event describing the conflict update. The first import queue 303 can receive the event, and/or multiple events, from the request processing component 311, and process the event and/or multiple events. In some implementations, the first update importer 304 can cause the first import queue 303 to process the event(s). In some implementations, the first update importer 304 can, for example, be caused to send a signal to the import integrator 116 of the first compute device (not shown in FIG. 5) to push the conflict update generated by the request processing component 311 into the system of record 117 of the first compute device. In some cases, the import integrator 116 can send a signal to the first datastore 216 to record the conflict update. The import integrator 116 can, for example, import the conflict update into fields of the system of record 117 of the first compute device. The import integrator 116 of the first compute device can also, for example, transmit a first service request along with the conflict update to the first datastore 216 in response to the event describing the conflict update being processed. This is so, at least in part, to make any updates to the first request at the first datastore 216 based on the event.

Figure 6:
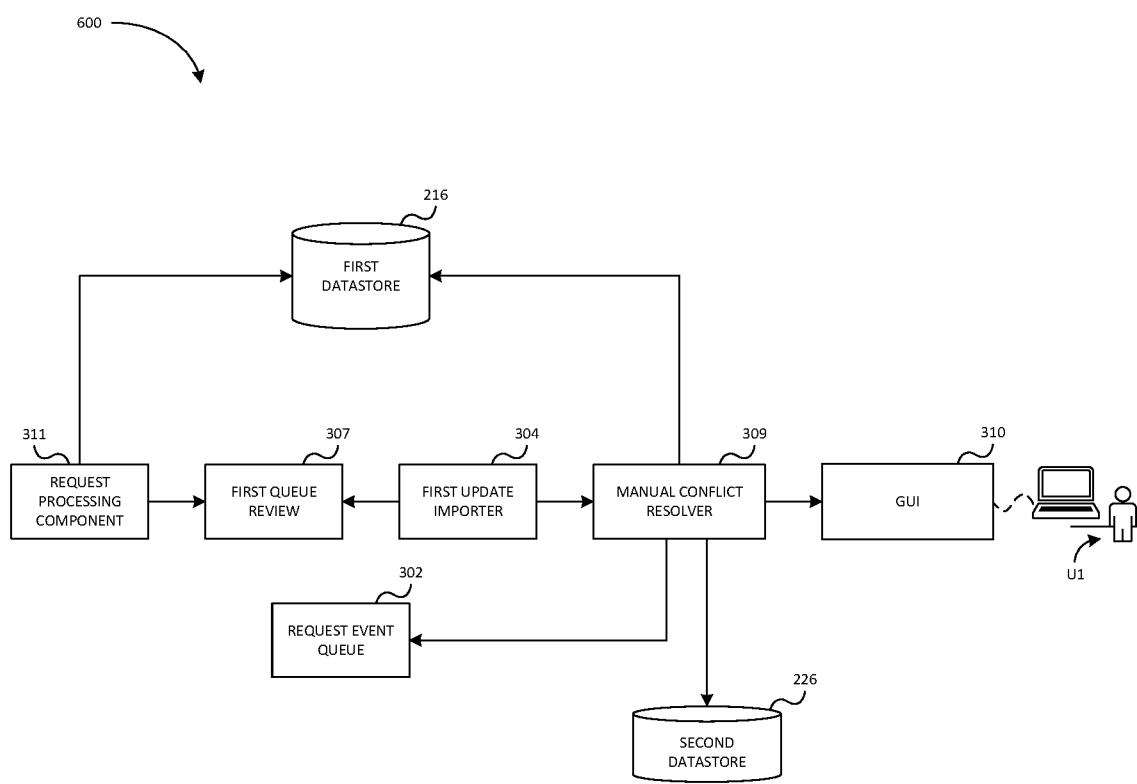
FIG. 6 is a flow diagram of subsystem for processing conflicts at a multi-tenant computer system, according to one or more embodiments.

FIG. 6 is a flow diagram of subsystem 600 of the system 300 of FIG. 3 where the subsystem 600 is a representation of a portion of the system 300 for processing conflicts at a multi-tenant computer system, according to one or more embodiments. The subsystem 600 includes components of the first compute device and/or first cloud environment of FIGS. 2A-B such as, for example, the first datastore 216 and the first operator U1. The subsystem 600 can also include the second datastore 226 of the second cloud environment of FIGS. 2A-B. The system 300 can also include components of the multi-tenant computer system and/or the multi-tenant compute device of FIG. 3 such as, for example, the request processing component 311, the first review queue 307, the first update importer 304, the manual conflict resolver 309, the GUI 310, and/or the request event queue 302.

The request processing component 311 can generate an event describing, for example, an update indicative of a conflict based on priority schemes and/or rules of the first compute device and/or the second compute device. In some cases, the event can also describe updates that are indicative of data that are automatically merged and/or to be merged. In some cases, the event can also describe differences of data in response to a conflict. The events describing the conflicts can be queued in the first review queue 307 and/or can be manually reviewed at the request event queue 302 by the first operator U1 via interacting with the GUI 310. The first operator U1 can use the GUI 310 to view, visualize, and/or resolve conflicts. In some implementations, resolution of conflicts can be published and/or stored in the multi-tenant datastore (not shown in FIG. 6) at the multi-tenant computer system, which can be connected to the first datastore 216 of the first compute device. In some implementations, the first update importer 304 can send a signal and/or generate an event to re-trigger processing of events describing conflicts via the first review queue 307. In response to the re-triggering the processing of events, the request processing component 311 can use resolutions of previous conflicts to remove future conflicts to generate events describing conflict updates to be imported back into the second datastore 226 associated with the first operator U1. In some implementations, the resolutions used to resolve conflicts can be automatically dissolved after service requests associated with that conflict are no longer identified to have those conflicts.

In some implementations, the multi-tenant computer system can encounter service requests having fields with same priorities between multiple users. For instance, the first service request from the first compute device and the second service request from the second compute device can have fields with the same priorities. The multi-tenant computer can be unable to automatically decide a correct response (e.g., resolution) where fields have the same priority, resulting in a conflict. In some implementations, the conflict can include contextual information for the first operator U1 and/or the second operator (not shown in FIG. 6) to be manually reviewed and/or to manually resolve the conflict via the manual conflict resolver 309.

Figure 7:
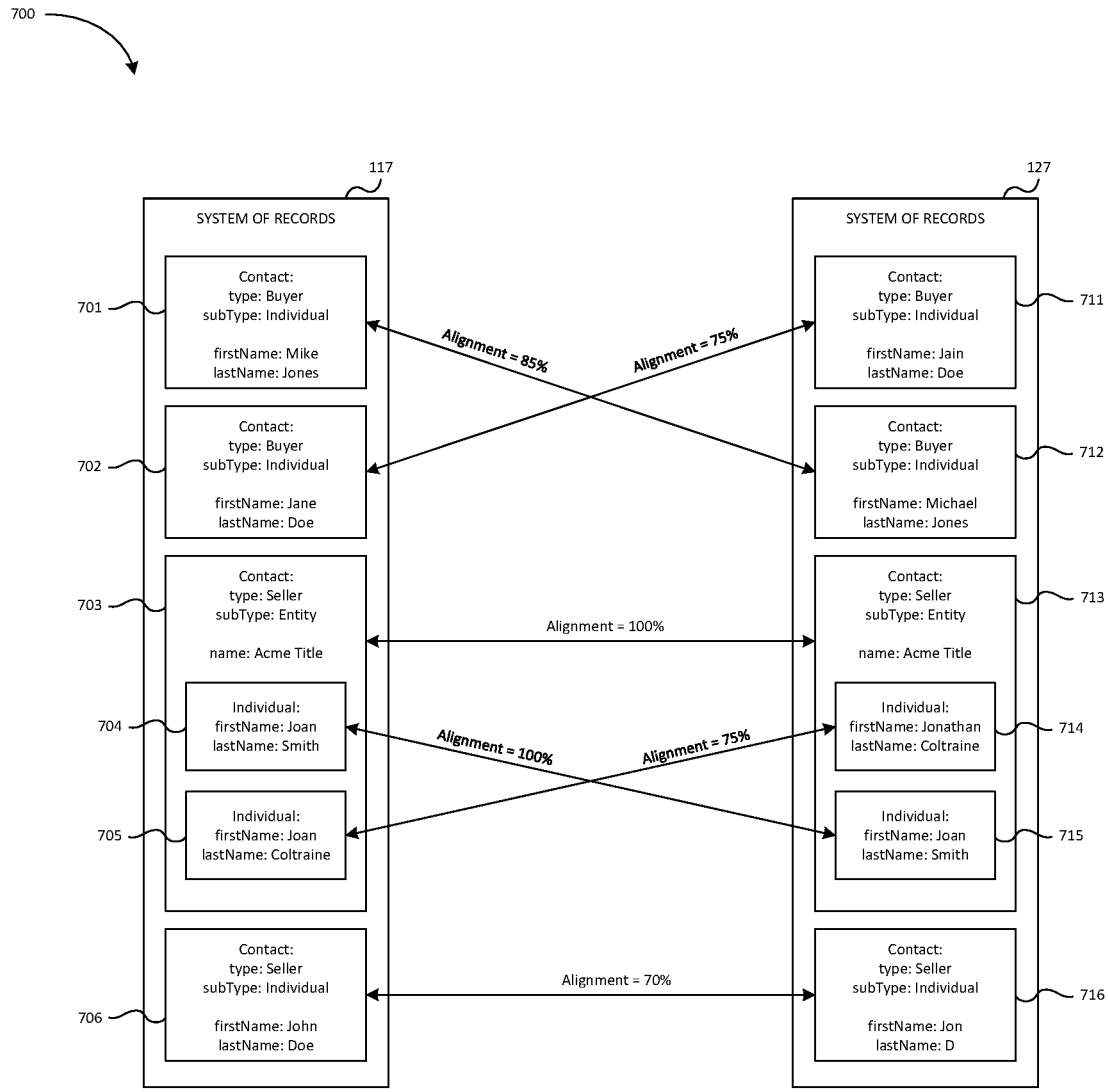
FIG. 7 is an illustration of subsystem for an alignment of data values in systems of records, according to one or more embodiments.

FIG. 7 is an illustration of system 700 for an alignment of data values in systems of records, according to one or more embodiments. The system 700 can include, for example a first system of record 117 and a second system of record 127. The first system of record 117 can be consistent with the system of record 117 of the first compute device of FIG. 1. The second system of record 127 can be consistent with the system of record 127 of the second compute device of FIG. 1. The first system of record 117 can be associated with a sender (e.g., the first compute device) and the second system of record 127 can be associated with a recipient (e.g., the second compute device). The alignment of data values can enable the multi-tenant computer system (not shown in FIG. 7) to relate heterogeneous or homogenous data so that prioritization and merging of data can occur.

In some implementations, every data value in a service request of data values from a system of record can be compared with zero or one item in a corresponding service request of a different system of record. Information in the data values can be aligned with a configurable scheme that can be customized by an operator based on a transaction type (e.g., refinance/purchase). Information can be identified using repeatable and/or unique fields (e.g., first name, last name, social security number, etc.) to be identified.

For instance, the first system of record 117 can include a set of data values (e.g., data value 701/702/703/706). The set of data values can be, for example, a list of contacts associated and/or known by the first compute device associated with the first system of record 117. The second system of record 127 can include a set of data values (e.g., data value 711/712/713/716). The set of data values of the first system of record 117 can be, for example, a list of contacts associated with and/or known by the first compute device associated with the first system of record 117. The set of data values of the second system of record 127 can be, for example, a list of contacts associated with and/or known by the second compute device associated with the second system of record 127. Each data value can include a set of fields describing various information such as, for example contact information.

Data value 701 of the first system of record 117 can include contact information such as, for example, a type of contact: "buyer", a subtype of contact: "individual", a first name: "Mike", a last name: "Jones", a social security number: "000-00-000", and/or the like. Data value 702 of the first system of record 117 can include contact information such as, for example, a type of contact: "buyer", a subtype of contact: "individual", a first name: "Jane", a last name: "Doe", a social security number: "missing", and/or the like.

Data value 703 of the first system of record 117 can include contact information such as, for example, a type of contact: "seller", a subtype of contact: "entity", an entity name: "Company A", and/or the like. In some implementations, the data value 703 can include multiple sub-data values (e.g., sub-data value 704/705) representing individuals associated with the entity. Sub-data value 704 can include contact information such as, for example, a first name "Joan", and a last name: "Smith". Sub-data value 705 can include contact information such as, for example, a first name "Joan", and a last name: "Coltraine".

Data value 706 of the first system of record 117 can include contact information such as, for example, a type of contact: "seller", a subtype of contact: "individual", a first name: "John", a last name: "Doe", and/or the like.

Data value 711 of the second system of record 127 can include contact information such as, for example, a type of contact: "buyer", a subtype of contact: "individual", a first name: "Jain", a last name: "Doe", a social security number: "000-00-000", and/or the like. Data value 712 can include contact information such as, for example, a type of contact: "buyer", a subtype of contact: "individual", a first name: "Michael", a last name: "Jones", a social security number: "missing", and/or the like.

Data value 713 can include contact information such as, for example, a type of contact: "seller", a subtype of contact: "entity", an entity name: "Company A", and/or the like. In some implementations, the data value 713 can include multiple sub-data values (e.g., sub-data value 714/715) representing individuals associated with the entity. Sub-data value 714 can include contact information such as, for example, a first name "Jonathan", and a last name: "Coltraine". Sub-data value 715 can include contact information such as, for example, a first name "Joan", and a last name: "Smith".

Data value 716 of the second system of record 127 can include contact information such as, for example, a type of contact: "seller", a subtype of contact: "individual", a first name: "Jon", a last name: "D", and/or the like.

The multi-tenant computer system can implement an alignment scheme to logically relate the set of data values of the first system of record 117 (e.g., data values 701, 702, 703, 706 and sub-data values 704, 705) to the set of data values of the second system of record 127 (e.g., data values 711, 712, 713, 716 and sub-data values 714, 715). The alignment scheme can be, for example, a pre-configured mechanism that controls how homogenous or heterogeneous collections of information are related to support contextually accurate data comparisons. The alignment scheme can include paths that match information within the multi-tenant computer system and matches paths aligned using specific policies. For instance, the specific policies can be arbitrary and/or extensible and include, for example, use existing fields (e.g., contact type, first name, last name, etc.), use exact match on specific fields (e.g., contact type), use a fuzzy matching scheme, use an alias table that relate common first name and/or last name variations (e.g., "Joe" and "Joseph", "Mike" and "Michael", "John" and "Johnathon", "Dick" and "Richard", etc.), use machine learning methods or artificial intelligence, use weighted scores for different fields, use a combination of multiple methods, and/or the like.

In some implementations, the multi-tenant compute device at the multi-tenant computer system can be configured to determine an alignment score for a data value from the set of data values (e.g., data values 701, 702, 703, 706 and sub-data values 704, 705) specified by the first compute device and associated with a field from the set of fields (e.g., first name, last name, contact type, etc.), and a data value from the set of data values (e.g., data values 711, 712, 713, 716 and sub-data values 714, 715) specified by the second compute device and associated with a field from the set of fields. In some implementations, the multi-tenant compute device can be configured to select the data value from the set of data values (e.g., data values 701, 702, 703, 706 and sub-data values 704, 705) specified by the first compute device or the data value from the set of data values (e.g., data values 711, 712, 713, 716 and sub-data values 714, 715) specified by the second compute device, based on the alignment score for the data value specified by the first compute device and the alignment score for the data value specified by the second compute device. The alignment score for the data value from the set of data values specified by the first compute device can be the same or different as the alignment score for the data value from the set of data values specified by the second compute device.

The alignment score can be a value and/or percentage representing a match between data values of the first system of record 117 specified by the first compute device and data values of the second system of record 127 specified by the second compute device. For example, the alignment scheme can logically relate data value 701 of the first system of record 117 with data value 712 of the second system of record 127 using a fuzzy matching algorithm while excluding other data values with different types of data. The alignment score between the data value 701 and the data value 712 can be based on matching information in the fields (e.g., first name, last name, social security number, etc.). The data value 701 and the data value 712 have identical information but the data value 701 has a first name of "Mike" while the data value 712 has a first name of "Michael". Although the first names between the data value 701 and the data value 712 are slightly different, they are a variation of one another and thus is given the alignment score of, for example, 85%.

Figure 8A:
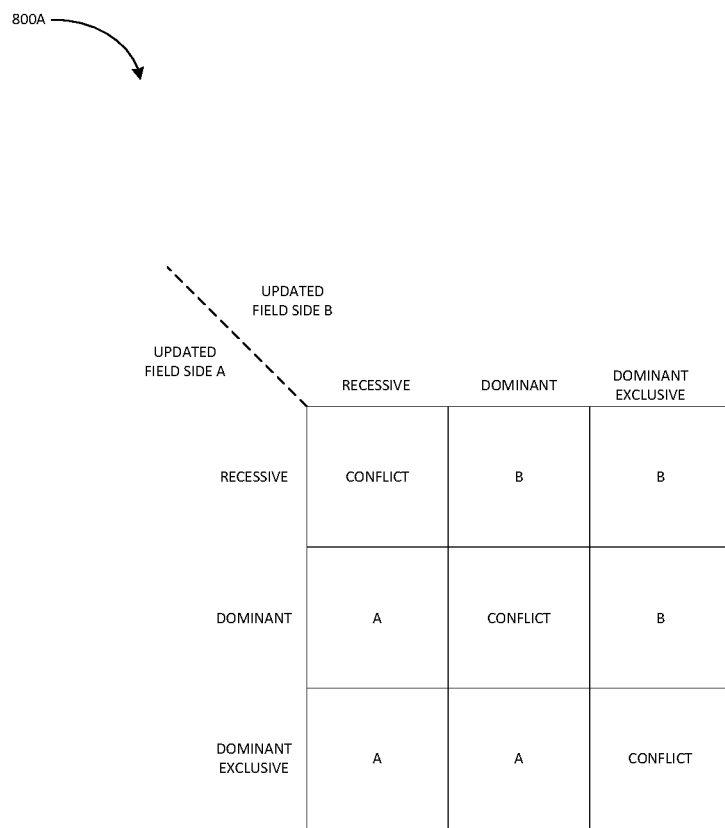

FIG. 8A-B are illustrations depicting prioritization of service requests for the multi-tenant computer system, according to one or more embodiments. The multi-tenant computer system can identify levels of prioritization such as, for example, recessive, dominant, and exclusive dominant. The recessive prioritization level can allow data values of a service request from one compute device to be overridden by data values of a service request from another compute device. The dominant prioritization level can ensure data values of a service request from one compute device overrides data values of a service request from another compute device. The dominant-exclusive prioritization level can ensure that if a field of a service request from one compute device is changed, a corresponding field of a service request from another compute device is also be changed. For instance, if a value in a first compute device is removed, then a corresponding value is also removed in a second compute device.

FIG. 8A includes a table 800A depicting results from prioritization. In some implementations, the recessive prioritization level can cause, for example, data that is recessive to be replaced with data that is dominant and/or dominant-exclusive. The recessive prioritization level can cause, for example, data that is recessive can be transferred into a dominant collection, object and/or field if data at that dominant collection, object and/or field is missing. The recessive prioritization level can cause, for example, data that is recessive to be unable to be transferred into a dominant collection, object, and/or field if data is missing and/or is also dominant-exclusive at that dominant collection, object, and/or field. The recessive prioritization level can cause, for example, data that is recessive to conflict with another data that is also recessive.

In some implementations, the dominant prioritization level can cause, for example, data that is dominant to replace data that is recessive. The dominant prioritization level can also cause, for example, data that is dominant to transfer into a dominant or recessive collection, object, or field if data at that dominant or recessive collection, object, or field is missing. The dominant prioritization level can also cause, for example, data that is dominant to be unable to be transferred into a dominant collection, object, or field if that in that dominant collection, object, and/or field is also dominant-exclusive. The dominant prioritization level can also cause, for example, data that is dominant to conflict with data that is also dominant.

In some implementations, the dominant-exclusive prioritization level can cause, for example, data that is dominant-exclusive to replace data and/or remove data that is dominant or recessive. The dominant-exclusive prioritization level can cause, for example, data that is dominant-exclusive to transfer into a dominant or recessive collection, object, or field if data at that dominant or recessive collection, object, or field if that data is missing is missing. The dominant-exclusive prioritization level can cause, for example, data that is dominant-exclusive to be unable to be transferred into a dominant-exclusive collection, object, and/or field if data at that dominant-exclusive collection, object, and/or field is missing and/or is also dominant-exclusive, resulting in a conflict. The dominant-exclusive prioritization level can cause, for example, data that is dominant-exclusive to conflict with another data that is also dominant-exclusive.

FIG. 8B includes a table 800B depicting data removed based on dominant-exclusive data as represented by FIG. 8A. As described previously, dominant-exclusive data that is missing can cause dominant or recessive data to be removed.

Figure 9:
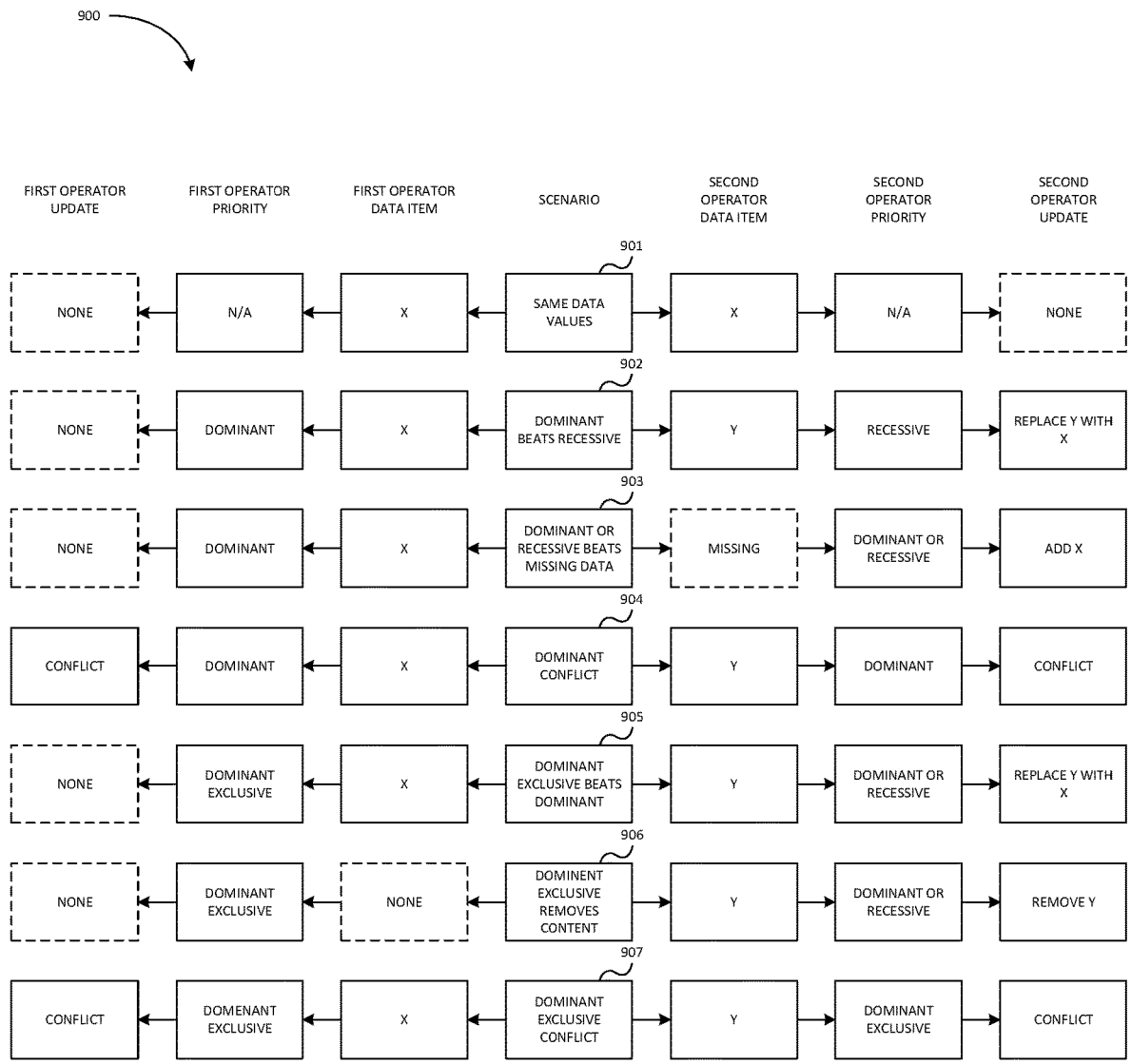
FIG. 9 is an illustration of prioritization schemes between two users with varying priorities and data values of a multi-tenant computer system.

FIG. 9 can include a diagram of prioritization schemes 900 between two users (e.g., first operator and second operator) with varying priorities and data values of a multi-tenant computer system. In some implementations, prioritization of service requests can be granularized within a given level using a priority score that can be used to compare with other servicer requests. In some implementations, the multi-tenant computer system can support a data model that normalizes information from all operators of compute devices. For instance, operators can control priority of data on a collection, object, and/or field-level bases. In some implementations, the prioritization scheme 900 can scenarios such as, for example, same data values 901, dominant beats recessive 902, dominant or recessive beats missing data 903, dominant conflict 904, dominant-exclusive beats dominant 905, dominant-exclusive removes content 906, dominant-exclusive conflict 907.

In some implementations, the first operator can consider a type of transaction such as, for example, loans as dominant while the second operator considers a different type of transaction such as, for example, commitments as dominant. The first operator can be recessive on loans but can be authoritative on a borrower (e.g., the second operator) and data of the borrower such as, for example, a social security number. In some cases, the first operator can be recessive on other operators that are sellers but can also be dominant-exclusive on operators that are buyers. In some cases, multiple operators that are authoritative on data such as, for example, property address, can dictate that neither operator should be dominant over the other on that data. For instance, operators with the same rules can indicate a conflict that notifies that each operator must take action to resolve the conflict to enable a transaction to continue.

In some instances, the same data values 901 scenario can include that each of the first operator and the second operator have a data value of "X" for the same field and no priority is applied, resulting in no conflict update being generated to cause an update to a first service request associated with the first operator or a second service request associated with the second operator.

In some instances, the dominant beats recessive 902 scenario can include a data value that is dominant to replace a data value that is recessive. For example, a data value associated with the second operator can be "Y" and can be recessive while a data value associated with the first operator can be "X" and be dominant. As such, the data value "Y" associated with the second operator can be replaced with the data value "X" associated with the first operator as that data value is dominant. The multi-tenant computer system can generate an event describing a conflict update indicating that the data value "Y" of the second request associated with the second operator is to be replaced with the data value "X" of the first request associated with the first operator. The multi-tenant computer system can transmit the event describing the conflict update to the second compute device.

In some instances, the dominant or recessive beats missing data 903 scenario can include data values that are either dominant or recessive to add data that is missing. For example, the first operator can have a data value of "X" for a field while the second operator has a missing data value at a corresponding filed. The data value "X" of the first operator can be dominant while the missing data value of the second operator can be dominant or recessive. As such, the data value "X" can be added into the corresponding field with the missing data value of the second operator. The multi-tenant computer system can generate an event describing a conflict update indicating that the data value "X" of the first request of the first operator is to be added into the corresponding field with the missing data value of the second request of the second operator and send it to the second compute device.

In some instances, the dominant conflict 904 scenario can include a data value of each of the first operator and the second operator being dominant and causing a conflict. As such, the multi-tenant computer system can generate an event describing a conflict to be resolved and transmit it to both the first compute device and the second compute device.

In some instances, the dominant-exclusive beats dominant 905 scenario can include a data value that is dominant-exclusive replacing a data value that is dominant or recessive. For example, the first service request can have a data value "X" that is dominant-exclusive while the second request can have data value "Y" that is either dominant or recessive. As such, the data value "Y" of the second request can be replaced with the data value "X" of the first request. The multi-tenant computer system can also generate an event describing a conflict update to the second compute device indicating that the data value "Y" of the second service request is to be replaced with data value "X" of the first service request.

In some instances, the dominant-exclusive removes content 906 scenario can include removing a data value at a field if a corresponding field missing a data value is considered dominant-exclusive. For example, a data value at a field from the first service request can be missing while that field is considered to be dominant-exclusive. A corresponding field from the second service request can have a data value "Y" that is dominant or recessive. As such, the data value "Y" can be removed based on the missing data value of the first request being dominant-exclusive. The multi-tenant computer system can generate an event describing a conflict update indicating that the data value "Y" is to be removed from the field from the second service request.

In some instances, the dominant-exclusive conflict 907 scenario can include service requests with respective fields having the same or different data values that are both dominant-exclusive. As such, the multi-tenant computer system can generate an event describing a conflict to the first compute device and the second compute device.

Figure 10:
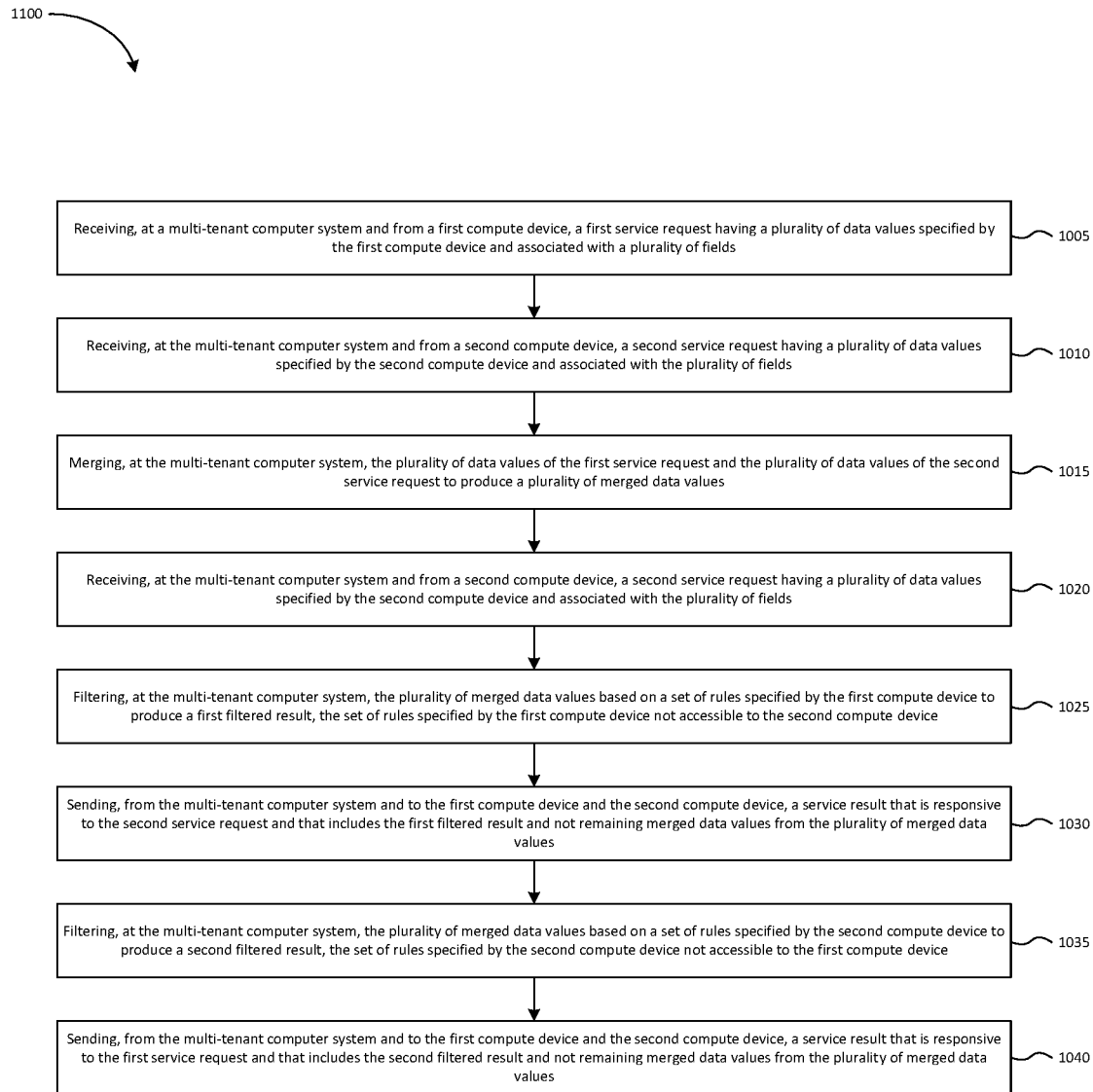
FIG. 10 is a flow diagram of a method for a multi-tenant computer system for producing service results by matching and resolving conflicts of service requests from client compute devices, according to one or more embodiments.

FIG. 10 is a flow diagram of a method 1000 for a multi-tenant computer system for producing service results by matching and resolving conflicts of service requests from client compute devices, according to one or more embodiments. At 1005, the method 1000 includes receiving, at a multi-tenant computer system and from a first compute device, a first service request having a set of data values specified by the first compute device and associated with a set of fields.

At 1010, the method 1000 includes receiving, at the multi-tenant computer system and from a second compute device, a second service request having a set of data values specified by the second compute device and associated with the set of fields.

At 1015, the method 1000 includes merging, at the multi-tenant computer system, the set of data values of the first service request and the set of data values of the second service request to produce a set of merged data values.

At 1020, the method 1000 includes receiving, at the multi-tenant computer system and from a second compute device, a second service request having a set of data values specified by the second compute device and associated with the plurality of fields. In some implementations, the method 1000 can include identifying, at the multi-tenant computer system, the first service request and the second service request being related based on an identifier of the first compute device. In some cases, the method 1000 can further include identifying the set of data values specified by the first compute device, an identifier of the second compute device, and the set of data values specified by the second compute device.

At 1025, the method 1000 includes filtering, at the multi-tenant computer system, the plurality of merged data values based on a set of rules specified by the first compute device to produce a first filtered result. In some implementations, the set of rules specified by the first compute device is not accessible to the second compute device. In some implementations, the method 100 can include filtering based on the set of rules specified by the first compute device and filtering based on the set of rules specified by the second compute device being performed in response to identifying the first service request and the second service request being related.

At 1030, the method 1000 includes sending, from the multi-tenant computer system and to the first compute device and the second compute device, a service result that is responsive to the second service request and that includes the first filtered result and not remaining merged data values from the set of merged data values. In some implementations, the method 1000 can include sending a first portion of the resolved conflicts to the first compute device to cause the first compute device to update the set of data values specified by the first compute device based on the first portion of the resolved conflicts.

At 1035, the method 1000 includes filtering, at the multi-tenant computer system, the set of merged data values based on a set of rules specified by the second compute device to produce a second filtered result. In some implementations, the set of rules specified by the second compute device is not accessible to the first compute device.

At 1040, the method 1000 includes sending, from the multi-tenant computer system and to the first compute device and the second compute device, a service result that is responsive to the first service request and that includes the second filtered result and not remaining merged data values from the set of merged data values. In some implementations, the method 1000 can include sending a second portion of the resolved conflicts to the second compute device to cause the second compute device to update the set of data values specified by the second compute device based on the second portion of the resolved conflicts. In some cases, the second portion of the resolved conflicts can be different than the first portion of the resolved conflicts.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisional s, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory processor-readable medium storing code representing instructions to be executed by a processor, the code comprising code to cause the processor to:
   receive, at a multi-tenant computer system and from a first compute device, a first service request having a plurality of data values specified by the first compute device and associated with a plurality of fields,
   receive, at the multi-tenant computer system and from a second compute device, a second service request having a plurality of data values specified by the second compute device and associated with the plurality of fields,
   the plurality of data values of the first service request not accessible by the second compute device, the plurality of data values of the second service request not accessible by the first compute device;
   merge, at the multi-tenant computer system, the plurality of data values of the first service request and the plurality of data values of the second service request to produce a plurality of merged data values;
   resolve conflicts, at the multi-tenant computer system, within the plurality of merged data values to produce a plurality of merged data with resolved conflicts;
   filter, at the multi-tenant computer system, the plurality of merged data with resolved conflicts based on a set of rules specified by the first compute device to produce a first filtered result, the set of rules specified by the first compute device not accessible to the second compute device;

send, from the multi-tenant computer system and to the first compute device, a first portion of the plurality of merged data with resolved conflicts to cause the first compute device to update the plurality of data values specified by the first compute device based on the first portion of the plurality of merged data with resolved conflicts;

send, from the multi-tenant computer system and to the first compute device and the second compute device, a service result that is responsive to the second service request and that includes the first filtered result and not remaining merged data from the plurality of merged data with resolved conflicts;

filter, at the multi-tenant computer system, the plurality of merged data with resolved conflicts based on a set of rules specified by the second compute device to produce a second filtered result, the set of rules specified by the second compute device not accessible to the first compute device;

send, from the multi-tenant computer system and to the second compute device, a second portion of the plurality of merged data with resolved conflicts to cause the second compute device to update the plurality of data values specified by the second compute device based on the second portion of the plurality of merged data with resolved conflicts; and send, from the multi-tenant computer system and to the first compute device and the second compute device, a service result that is responsive to the first service request and that includes the second filtered result and not remaining merged data from the plurality of merged data with resolved conflicts.

2. The non-transitory processor-readable medium of claim 1, the code further comprising code to cause the processor to:

identify, at the multi-tenant computer system, the first service request and the second service request being related based on an identifier of the first compute device, the plurality of data values specified by the first compute device, an identifier of the second compute device, and the plurality of data values specified by the second compute device, the code to merge, the code to filter based on the set of rules specified by the first compute device, and the code to filter based on the set of rules specified by the second compute device being performed in response to identifying the first service request and the second service request being related.

3. The non-transitory processor-readable medium of claim 1, the code further comprising code to cause the processor to:

determine an alignment score for (1) a data value from the plurality of data values specified by the first compute device and associated with a field from the plurality of fields, and (2) a data value from the plurality of data values specified by the second compute device and associated with the field from the plurality of fields, and select the data value from the plurality of data values specified by the first compute device or the data value from the plurality of data values specified by the second compute device, based on the alignment score.

4. The non-transitory processor-readable medium of claim 1, wherein:

a data value from the plurality of data values of the first service request and associated with a first field from the plurality of fields corresponding with a data value from the plurality of data vales of the second service request and associated with the first field, a data value from the plurality of data values of the first service request and associated with a second field from the plurality of fields differing with a data value from the plurality of data values of the second service request and associated with the second field, and the code to cause the processor to merge includes code to cause the processor to select the data value for the first service request and associated with the second field and not select the data value for the second service request and associated with the second field, in response to a priority defined by a user of the first compute device for the data value for the first service request and associated with the second field being greater than a priority defined by a user of the second compute device for the data value for the second service request and associated with the second field.

5. The non-transitory processor-readable medium of claim 1, the code further comprising code to cause the processor to:

store, at a volatile, non-persistent memory of the multi-tenant computer system, the plurality of data values specified by the first compute device, the set of rules specified by the first compute device, the plurality of data values specified by the second compute device and the set of rules specified by the second compute device.

6. The non-transitory processor-readable medium of claim 1, wherein:

the plurality of data values specified by the first compute device is stored at a memory separate from and inaccessible to the second computer device, and the plurality of data values specified by the second compute device is stored at a memory separate from and inaccessible to the first computer device.

7. The non-transitory processor-readable medium of claim 1, wherein:

the plurality of data values specified by the first compute device is stored at a memory accessible to the multi-tenant computer system and associated with a single-tenant account of the multi-tenant computer system.

8. An apparatus, comprising:

a multi-tenant computer system including a processor and a memory operatively coupled to the processor, the memory configured to store (1) a first service request having a plurality of data values specified by a first compute device and associated with a plurality of fields, (2) a set of rules specified by the first compute device, (3) a second service request having a plurality of data values specified by a second compute device and associated with the plurality of fields, and (4) a set of rules specified by the second compute device, the plurality of data values of the first service request and the set of rules specified by the first compute device not accessible by the second compute device, the plurality of data values of the second service request and the set of rules specified by the second compute device not accessible by the first compute device;

the processor configured to merge the plurality of data values of the first service request and the plurality of data values of the second service request to produce a plurality of merged data values;

the processor configured to resolve conflicts within the plurality of merged data values to produce a plurality of merged data with resolved conflicts;

the processor configured to filter the plurality of merged data with resolved conflicts based on the set of rules specified by the first compute device to produce a first filtered result;

the processor configured to send a first portion of the plurality of merged data with resolved conflicts to the first compute device to cause the first compute device to update the plurality of data values specified by the first compute device based on the first portion of the plurality of merged data with resolved conflicts;

the processor configured to send to the first compute device and the second compute device a service result that is responsive to the second service request and that includes the first filtered result and not remaining merged data from the plurality of merged data with resolved conflicts;

the processor configured to filter the plurality of merged data with resolved conflicts based on the set of rules specified by the second compute device to produce a second filtered result;

the processor configured to send a second portion of the plurality of merged data with resolved conflicts to the second compute device to cause the second compute device to update the plurality of data values specified by the second compute device based on the second portion of the plurality of merged data with resolved conflicts, the second portion of the plurality of merged data with resolved conflicts being different than the first portion of the plurality of merged data with resolved conflicts; and the processor configured to send to the first compute device and the second compute device a service result that is responsive to the first service request and that includes the second filtered result and not remaining merged data from the plurality of merged data with resolved conflicts.

9. The apparatus of claim 8, wherein:

the processor is configured to identify the first service request and the second service request being related based on an identifier of the first compute device, the plurality of data values specified by the first compute device, an identifier of the second compute device, and the plurality of data values specified by the second compute device, the processor is configured (1) to merge, (2) to filter based on the set of rules specified by the first compute device and (3) to filter based on the set of rules specified by the second compute device, in response to the first service request and the second service request being identified as related.

10. The apparatus of claim 8, wherein:

the processor is configured to determine an alignment score for (1) a data value from the plurality of data values specified by the first compute device and associated with a field from the plurality of fields, and (2) a data value from the plurality of data values specified by the second compute device and associated with the field from the plurality of fields, and the processor is configured to select the data value from the plurality of data values specified by the first compute device or the data value from the plurality of data values specified by the second compute device, based on the alignment score.

11. The apparatus of claim 8, wherein:

a data value from the plurality of data values of the first service request and associated with a first field from the plurality of fields corresponds with a data value from the plurality of data vales of the second service request and associated with the first field, a data value from the plurality of data values of the first service request and associated with a second field from the plurality of fields differs with a data value from the plurality of data values of the second service request and associated with the second field, and the processor configured to merge by selecting the data value for the first service request and associated with the second field and not selecting the data value for the second service request and associated with the second field, in response to a priority defined by a user of the first compute device for the data value for the first service request and associated with the second field being greater than a priority defined by a user of the second compute device for the data value for the second service request and associated with the second field.

12. The apparatus of claim 8, wherein:

the processor is configured to store, at a volatile, non-persistent memory operatively coupled to the processor, the plurality of data values specified by the first compute device, the set of rules specified by the first compute device, the plurality of data values specified by the second compute device and the set of rules specified by the second compute device.

13. The apparatus of claim 8, wherein:

the plurality of data values specified by the first compute device are stored at a memory separate from and inaccessible to the processor, and the plurality of data values specified by the second compute device are stored at a memory separate from and inaccessible to the processor.

14. The apparatus of claim 8, wherein:

the plurality of data values specified by the first compute device are stored at a memory accessible to the processor and associated with a single-tenant account of a multi-tenant computer system that includes the processor.

15. A non-transitory processor-readable medium storing code representing instructions to be executed by a processor, the code comprising code to cause the processor to:

receive, at a multi-tenant computer system and from a first compute device, a first service request having a plurality of data values specified by the first compute device and associated with a plurality of fields;

receive, at the multi-tenant computer system and from a second compute device, a second service request having a plurality of data values specified by the second compute device and associated with the plurality of fields, the plurality of data values of the first service request not accessible by the second compute device, the plurality of data values of the second service request not accessible by the first compute device;

merge, at the multi-tenant computer system, the plurality of data values of the first service request and the plurality of data values of the second service request to produce a plurality of merged data values;

resolve conflicts, at the multi-tenant computer system, within the plurality of merged data values to produce a plurality of merged data with resolved conflicts;

send a first portion of the plurality of merged data with resolved conflicts to the second compute device and to the first compute device to cause the first compute device to update the plurality of data values specified by the first compute device based on the first portion of the plurality of merged data with resolved conflicts; and send a second portion of the plurality of merged data with resolved conflicts to the first compute device and to the second compute device to cause the second compute device to update the plurality of data values specified by the second compute device based on the second portion of the plurality of merged data with resolved conflicts, the second portion of the plurality of merged data with resolved conflicts being different than the first portion of the plurality of merged data with resolved conflicts.

16. The non-transitory processor-readable medium of claim 15, the code further comprising code to cause the processor to:

filter, at the multi-tenant computer system and after the conflicts are resolved, the plurality of merged data with resolved conflicts based on a set of rules specified by the first compute device to produce a first filtered result, the set of rules specified by the first compute device not accessible to the second compute device;

send, from the multi-tenant computer system and to the second compute device, a service result that is responsive to the second service request and that includes the first filtered result and not remaining merged data from the plurality of merged data with resolved conflicts;

filter, at the multi-tenant computer system and after the conflicts are resolved, the plurality of merged data with resolved conflicts based on a set of rules specified by the second compute device to produce a second filtered result, the set of rules specified by the second compute device not accessible to the first compute device; and send, from the multi-tenant computer system and to the first compute device, a service result that is responsive to the first service request and that includes the second filtered result and not remaining merged data from the plurality of merged data with resolved conflicts.

17. The non-transitory processor-readable medium of claim 15, the code further comprising code to cause the processor to:

determine an alignment score for (1) a data value from the plurality of data values specified by the first compute device and associated with a field from the plurality of fields, and (2) a data value from the plurality of data values specified by the second compute device and associated with the field from the plurality of fields, and select the data value from the plurality of data values specified by the first compute device or the data value from the plurality of data values specified by the second compute device, based on the alignment score.

18. The non-transitory processor-readable medium of claim 15, the code further comprising code to cause the processor to:

store, at a volatile, non-persistent memory of the multi-tenant computer system, the plurality of data values specified by the first compute device and the set of rules specified by the second compute device.

* * * * *